United States Patent
Mehta et al.

(10) Patent No.: US 11,336,515 B1
(45) Date of Patent: May 17, 2022

(54) SIMULTANEOUS INTEROPERABILITY WITH POLICY-AWARE AND POLICY-UNAWARE DATA CENTER SITES

(71) Applicant: Cisco Technology, Inc., San Jose, CA (US)

(72) Inventors: Munish Mehta, Fremont, CA (US); Sundeep Kumar Singh, Fremont, CA (US); Shyam N. Kapadia, San Jose, CA (US); Mohammed Javed Asghar, Dublin, CA (US); Lukas Krattiger, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/179,692

(22) Filed: Feb. 19, 2021

Related U.S. Application Data

(60) Provisional application No. 63/134,353, filed on Jan. 6, 2021.

(51) Int. Cl.
*H04L 41/0806* (2022.01)
*H04L 61/2596* (2022.01)
*H04L 69/22* (2022.01)
*H04L 12/46* (2006.01)

(52) U.S. Cl.
CPC ...... *H04L 41/0806* (2013.01); *H04L 12/4641* (2013.01); *H04L 61/2596* (2013.01); *H04L 69/22* (2013.01)

(58) Field of Classification Search
CPC ............. H04L 41/0806; H04L 12/4641; H04L 61/2596; H04L 69/22
See application file for complete search history.

(56) References Cited

U.S. PATENT DOCUMENTS

| | | | | |
|---|---|---|---|---|
| 10,243,834 B1* | 3/2019 | Shekhar | ................. | H04L 45/04 |
| 11,178,041 B1* | 11/2021 | Sivakumar | .............. | H04L 45/64 |
| 2014/0006585 A1* | 1/2014 | Dunbar | ................... | H04L 41/00 |
| | | | | 709/223 |
| 2014/0146817 A1* | 5/2014 | Zhang | ..................... | H04L 45/74 |
| | | | | 370/392 |
| 2014/0269705 A1* | 9/2014 | DeCusatis | .............. | H04L 45/52 |
| | | | | 370/390 |

(Continued)

OTHER PUBLICATIONS

Cisco, "Cisco ACI Multi-Site Architecture", Cisco Public, Jan. 2021, 136 pages.

*Primary Examiner* — Blake J Rubin
(74) *Attorney, Agent, or Firm* — Edell, Shapiro & Finnan, LLC

(57) ABSTRACT

Presented herein are systems and methods to enable simultaneous interoperability with policy-aware and policy-unaware data center sites. A multi-site orchestrator (MSO) device can be configured to obtain configuration information for each of a plurality of different data center sites. The data center sites may include one or more on-premises sites and one or more off-premises sites, each of which may include one or more policy-aware sites and/or one or more policy-unaware sites. The MSO can selectively use namespace translations to create a unified fabric across the different data center sites, enabling one or more hosts and/or applications at a first of the data center sites to communicate with one or more hosts and/or applications at a second of the data center sites, regardless of the sites' respective configurations.

20 Claims, 13 Drawing Sheets

(56) References Cited

U.S. PATENT DOCUMENTS

| | | | |
|---|---|---|---|
| 2014/0337497 A1* | 11/2014 | Wanser | H04L 41/0866 709/223 |
| 2015/0124826 A1 | 5/2015 | Edsall et al. | |
| 2016/0105392 A1* | 4/2016 | Thakkar | H04L 61/6022 709/220 |
| 2017/0019331 A1* | 1/2017 | Yong | H04L 45/64 |
| 2017/0033924 A1* | 2/2017 | Jain | H04L 63/06 |
| 2017/0063683 A1* | 3/2017 | Li | H04L 45/74 |
| 2017/0099160 A1 | 4/2017 | Mithyantha et al. | |
| 2018/0006930 A1* | 1/2018 | Du | H04L 67/28 |
| 2018/0048537 A1* | 2/2018 | Gaikwad | H04L 41/0896 |
| 2018/0331912 A1* | 11/2018 | Edmison | H04L 43/028 |
| 2018/0351879 A1* | 12/2018 | Zhang | H04L 49/25 |
| 2019/0149358 A1* | 5/2019 | Sharma | H04L 12/1854 370/254 |
| 2019/0222552 A1* | 7/2019 | Xiao | H04L 12/46 |
| 2019/0386919 A1 | 12/2019 | Li et al. | |
| 2020/0014634 A1 | 1/2020 | Asghar et al. | |
| 2020/0014636 A1 | 1/2020 | Vallepalli et al. | |
| 2020/0028758 A1 | 1/2020 | Tollet et al. | |
| 2020/0236046 A1* | 7/2020 | Jain | G06F 9/45558 |
| 2020/0344088 A1 | 10/2020 | Selvaraj et al. | |
| 2020/0374219 A1* | 11/2020 | Saha | H04L 61/2038 |
| 2021/0011780 A1* | 1/2021 | Wan | G06F 9/5083 |
| 2021/0194731 A1* | 6/2021 | Gao | H04L 12/4633 |
| 2021/0234715 A1* | 7/2021 | Liu | H04L 67/1095 |
| 2021/0314291 A1* | 10/2021 | Chandrashekhar | H04L 41/0893 |

\* cited by examiner

| | ON-PREMISES POLICY AWARE SITE | OFF-PREMISES POLICY AWARE SITE | POLICY UNAWARE SITE |
|---|---|---|---|
| ON-PREMISES POLICY AWARE SITE | - iVxLAN<br>- INGRESS TRANSLATIONS FOR VNID & CLASSID | - iVXLAN<br>- DOWNSTREAM VNID ASSIGNMENT<br>- EGRESS VNID TRANSLATION | - VXLAN<br>- EGRESS TRANSLATION IF SUPPORTED DOWNSTREAM<br>- INGRESS AND EGRESS TRANSLATION ELSEWHERE |
| OFF-PREMISES POLICY AWARE SITE | - iVxLAN<br>- DOWNSTREAM VNID ASSIGNMENT<br>- EGRESS VNID TRANSLATION | - iVxLAN<br>- DOWNSTREAM VNID ASSIGNMENT<br>- EGRESS VNID TRANSLATION | - VXLAN<br>- DOWNSTREAM VNID ASSIGNMENT<br>- EGRESS VNID TRANSLATION |
| POLICY UNAWARE SITE | - VXLAN<br>- EGRESS TRANSLATION IF SUPPORTED DOWNSTREAM<br>- INGRESS AND EGRESS TRANSLATION ELSEWHERE | - VXLAN<br>- DOWNSTREAM VNID ASSIGNMENT<br>- EGRESS VNID TRANSLATION | - VXLAN<br>- EGRESS TRANSLATION IF SUPPORTED DOWNSTREAM<br>- GLOBAL VNID WITHOUT TRANSLATIONS ELSEWHERE |

600

FROM / TO

FIG. 6

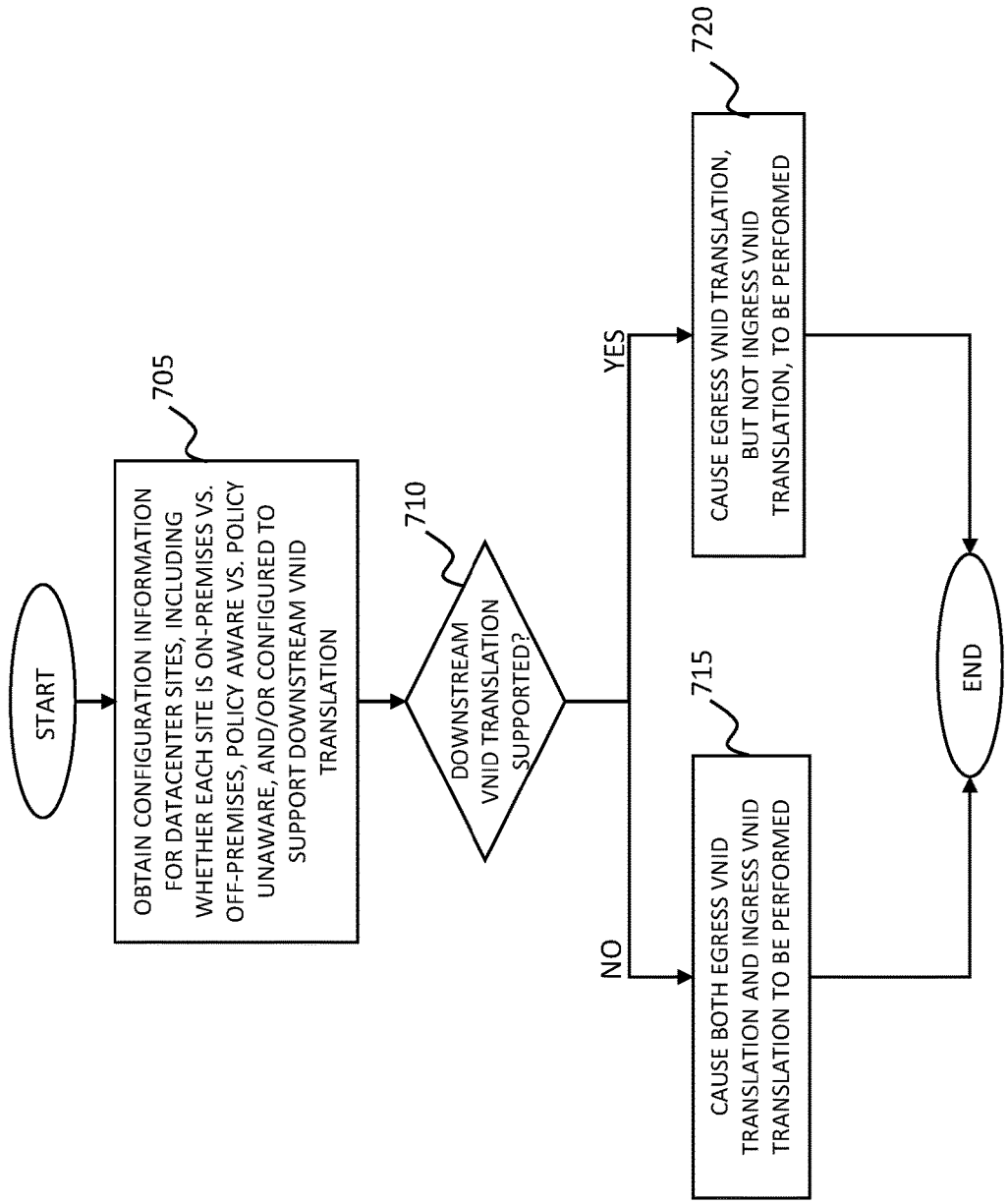

US 11,336,515 B1

SIMULTANEOUS INTEROPERABILITY WITH POLICY-AWARE AND POLICY-UNAWARE DATA CENTER SITES

CROSS REFERENCE TO RELATED APPLICATION

This application claims priority to U.S. Provisional Patent Application No. 63/134,353, titled "Simultaneous Interoperability with Policy-Aware and Policy-Unaware Data Center Sites," filed Jan. 6, 2021, the entirety of which is hereby incorporated herein by reference.

TECHNICAL FIELD

The present disclosure relates to network equipment and services.

BACKGROUND

A datacenter fabric can be deployed with a controller managing a set of switches in any of a variety of different architectures. A single instance of a fabric (and the hosts and applications coupled to the fabric) is referred to as a "site." The size of the site (e.g., the number of switches in the site) is typically limited based on various considerations, including a capacity of network domains in the site, cost and space constraints, and overall network architecture strategy (e.g., to prevent a site from serving as a "single point of failure").

To address these concerns, datacenter administrators often leverage multiple different sites which each have an independent switching fabric, potentially combining one or more privately hosted or on-premises hardware solutions (sometimes called "on-premises" sites) with one or more other externally hosted cloud solutions (sometimes called "off-premises" clouds). For example, this approach can provide a cost-effective means for increasing datacenter capacity and redundancy. However, using multiple different types of sites can present challenges with regard to configuration and management.

BRIEF DESCRIPTION OF THE DRAWINGS

FIG. 6 is a table depicting operations for facilitating simultaneous interoperability with policy-aware and policy-unaware data center sites, according to an example embodiment.

FIG. 7 is a flow chart depicting a method for facilitating simultaneous interoperability with policy-aware and policy-unaware data center sites, according to an example embodiment.

DESCRIPTION OF EXAMPLE EMBODIMENTS

Overview

Figure 1:
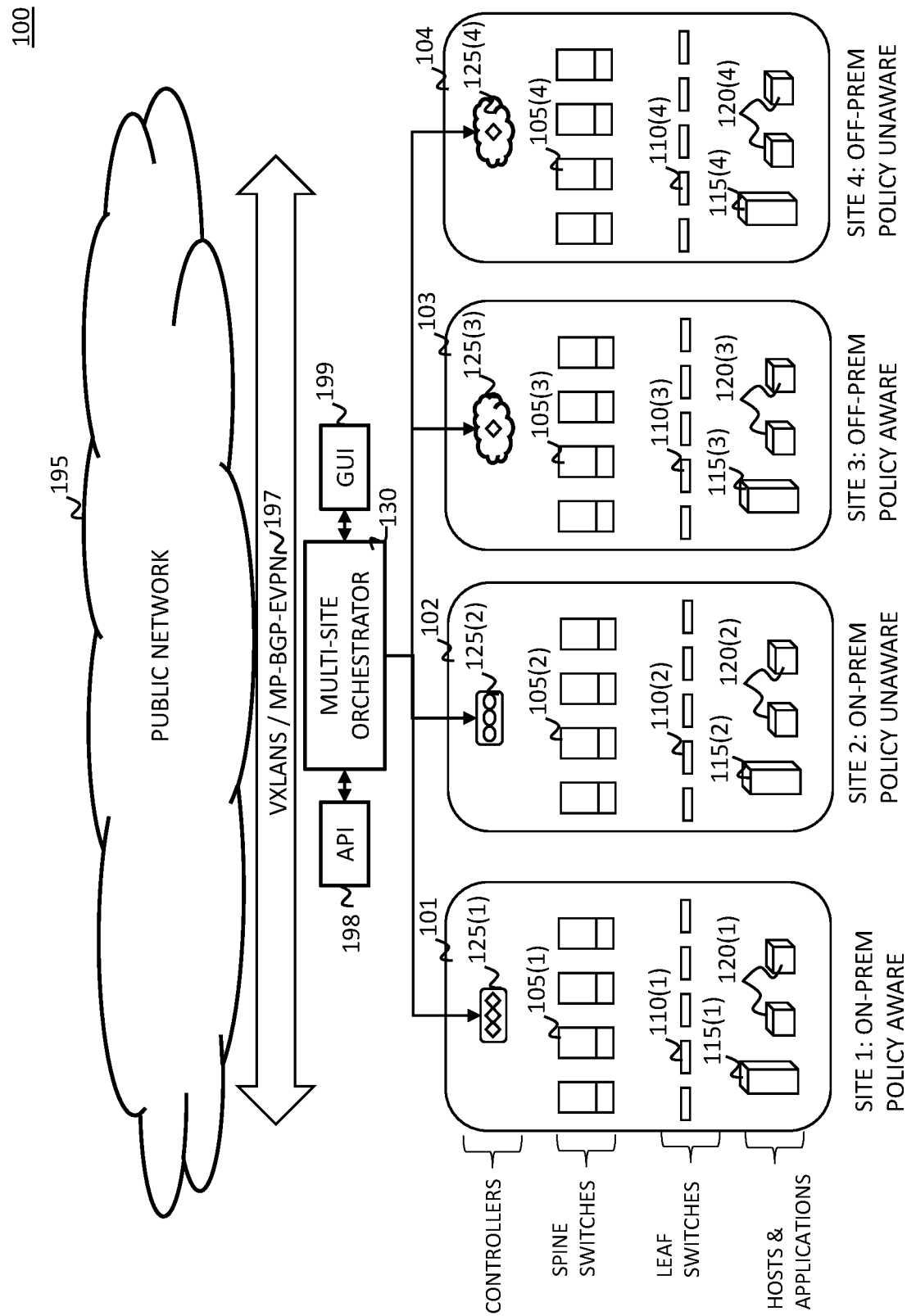
FIG. 1 is a diagram of a system in which techniques that facilitate simultaneous interoperability with policy-aware and policy-unaware data center sites may be implemented, according to an example embodiment.

A multi-site orchestrator (MSO) device can be configured to obtain configuration information for each of a plurality of different data center sites. The data center sites may include one or more on-premises sites and one or more off-premises sites, each of which may include one or more policy-aware sites and/or one or more policy-unaware sites. In this context, a "policy-aware" site is a data center site configured in a framework in which network devices communicate network policy information via a data packet header (e.g., in a "class ID" field and/or a "VNID" field, as described in more detail below), while a "policy-unaware" site is a data center configured in a framework in which network devices communicate data without including network policy information in a data packet header. For example, a policy-aware site can include a site operating in a framework (e.g., a Cisco® Application Centric Infrastructure (ACI) framework or another framework) in which an internal virtual extensible local area network (iVXLAN) (or other) header is used to convey policy and/or other information; and a policy-unaware site can include a site operating in a framework (e.g., a Cisco Data Center Network Manager (DCNM) framework or another framework) in which a standard virtual extensible local area network (VXLAN) (or other) header does not convey policy information.

The MSO can create a unified fabric across the different data center sites, enabling one or more hosts and/or applications at a first of the data center sites to communicate with one or more hosts and/or applications at a second of the data center sites, regardless of the sites' respective configurations. For example, the MSO can enable different hosts and/or applications to communicate with one another as part of a same endpoint group (EPG) or as part of multiple different EPGs. Each of the sites can include a different namespace, e.g., different identifiers for Virtual Routing and Forwarding (VRF) instances, Bridge Domains (BD), subnets, or EPGs. To enable interoperability between the sites, the MSO can cause translations to be performed with respect to these identifiers as appropriate. The MSO can determine whether and how translation will be performed, e.g., based on the capabilities and configurations of the sites. For example, the MSO can obtain configuration/capability information for each particular site, including, e.g., information regarding whether the site is on-premises or off-premises and whether the site is policy-aware or policy-unaware, upon onboarding the sites for communication. The MSO may infer at least some of this information based on a type of framework at the site. For example, an ACI framework may be inferred to be policy-aware, while a DCNM framework may be inferred to be policy-unaware, though other or different inferences and logic may be used.

In an example embodiment, for communications between a transmitting policy-aware site and a receiving policy-aware site, the MSO can install a data center interconnect (DCI) translator in a network device (e.g., a spine switch and/or a border leaf switch) at the receiving site so that, on ingress at the receiving site, one or more identifiers from the transmitting site (e.g., an identifier in a VNID field of an iVXLAN or VXLAN header and/or an identifier in a class ID field of an iVXLAN header) are translated to the receiving site's namespace. This "ingress translation" (or "upstream translation") can, e.g., cause a transmitted packet to appear to have originated from an object (e.g., a host or application) in the receiving site. Thus, one or more applicable security contracts may be satisfied, and potential conflicts between namespaces can be avoided.

The MSO can be further configured to enable translation at the site of transmission—i.e., "egress translation" (or "downstream translation"). For example, certain of the data center sites may be configured to enable downstream translation by providing to the MSO mapping information (e.g., VNID and/or next-hop information), which the MSO can use to enable the translation. With downstream translation, the transmitting site's VNID namespace is translated to the receiving site's VNID namespace prior to the transmission, similar to how a multiprotocol label switching (MPLS) technique provides forwarding/control-plane information in a network routing context.

For communications involving a first site, which supports downstream translation (i.e., a site configured to perform downstream translation) and a second site, which does not support downstream translation (i.e., a site that is not configured to perform downstream translation), the MSO can cause network devices (e.g., a spine switch, a border leaf switch, and/or another network device) at the first site to perform translations in both the ingress direction and the egress direction. For example, in the egress direction from the first site to the second site, the first site local VNID for BD/VFR can be rewritten to a corresponding mapped VNID of the second site. In the ingress direction from the second site to the first site, the second site will send traffic with a VNID corresponding to its domain namespace; the network device(s) at the first site can be configured to translate the VNID to the namespace of the first site upon ingress.

In an example embodiment, the MSO may determine whether a particular site supports downstream translation based on a type of framework at the site. For example, in making this determination, the MSO may infer that an ACI framework is configured to support downstream translation, while one or more other frameworks may be inferred not to support downstream translation. The MSO may, for example, assume, when it has limited or no information regarding a configuration of a particular framework, that the framework is not configured to support downstream translation (and potentially also is not configured to support upstream translation). As may be appreciated, these inferences are illustrative and other inferences and/or logic may be used.

Thus, the MSO can recognize site/domain capabilities and accordingly program applicable translations as appropriate, e.g., using iVXLAN for policy aware domains and (standard) VXLAN for policy unaware domains. This can enable support on a same border/DCI device for iVXLAN or VXLAN on a per neighbor site/domain basis. For example, the MSO can provide orchestration for sites/domains as follows: (1) for communications with policy unaware sites/domains: (a) providing ingress and egress VNID translations for interoperability with sites/domains that do not support downstream VNID translation; and (b) providing only egress VNID translation for interoperability with sites that do support downstream VNID translation; and (2) for communications with policy aware sites: (a) providing ingress VNID and class ID translations for on-premises policy aware sites, and (b) providing egress VNID translation for off-premises policy aware sites.

Example Embodiments

Referring first to FIG. 1, a block diagram is shown of a system 100 in which techniques that facilitate simultaneous interoperability with policy-aware and policy-unaware data center sites may be implemented, according to an example embodiment. In particular, the system 100 provides a unified fabric across multiple data center sites 101-104, namely Site 1 101, which includes an on-premises, policy aware data center site, Site 2 102, which includes an on-premises, policy unaware data center site, Site 3 103, which includes an off-premises, policy aware data center site, and Site 4 104, which includes an off-premises, policy unaware data center site. For example, Site 1 101 can operate in a Cisco ACI framework, Site 2 102 can operate in a Cisco DCNM framework, and each of Site 3 103 and Site 4 104 can operate in a non-Cisco public cloud framework and communicate with Site 1 101 and Site 2 102, e.g., using a Cisco cloud application policy infrastructure controller (APIC). As may be appreciated, the number and configurations of the sites 101-104 are illustrative; any number of sites 101-104 with any of a variety of different brands of devices and software and types and mixtures of configurations, now known or hereinafter developed, may be included in alternative example embodiments.

The sites 101-104 may include physical servers and/or data storage elements located in different physical data center sites and/or virtual cloud implementations deployed in different regions of one or more different cloud infrastructures. In the example depicted in FIG. 1, each of the sites 101-104 includes a respective switching fabric formed by one or more spine switches 105 and one or more leaf switches 110. The leaf switches 110 are communicatively coupled to hosts 115 and applications 120. That is, each of the hosts 115 and applications 120 use the spine switches 105 and leaf switches 110 to communicate with other hosts 115 and applications 120 in the same site, hosts 115 and applications 120 in different sites, and entities that are outside the unified fabric of the system 100. It should be appreciated that a spine-leaf architecture is not a requirement; the sites 101-104 can include any variety of network devices organized in any arrangement in alternative example embodiments.

In the example depicted in FIG. 1, a public network 195 (e.g., the Internet) facilitates traffic flow between the different sites 101-104. For example, each of the sites 101-104 can use one or more virtual extensible local area networks (VXLANs) 197 with a multiprotocol border gateway protocol (MP-BGP) Ethernet virtual private network (EVPN) (or another network function) to transmit data into the public network 195, which can then route the data to one of the spine switches 105 in another of the sites 101-104, where the data can be routed to a leaf switch 110 coupled to a destination host 115 or application 120.

As would be appreciated by a person of ordinary skill in the art, the hosts 115 and applications 120 may be assigned to one or more different EPGs to control traffic flow and provide security between the different hosts 115 and applications 120. For example, host 115(1) may be unable to communicate with application 120(3) unless these entities are in the same EPG or there is otherwise a security policy (also called a security "contract") that permits the EPGs to which the host 115(1) and application 120(3) are assigned to communicate. Each EPG includes a "security group" or other collection of endpoints representing an application tier or set of services. The endpoints (including the hosts 115 and the applications 120) can include one or more different types of physical devices, virtual devices, and/or applications, such as (but not limited to) one or more virtual machines, hypervisors, containers, physical servers, etc. One or more policies may be assigned to each EPG. For example, the policies can include a security policy, a quality of service (QoS) policy, a service chain policy, and/or a routing policy. Each policy applies to the EPG and each endpoint in the EPG.

Each of the sites 101-104 includes a controller 125, which is configured to establish a namespace for the site. Each controller 125 can be implemented via software, hardware, or a combination of software and hardware. In an example embodiment, each of the controllers 125 is configured to setup its respective namespace privately, independent of the namespaces established by the other controllers 125. As a result, the namespace in a first site (e.g., Site 1 101) may conflict or overlap with the namespace in a second site (e.g., Site 2 102). For example, when assigning values to the BDs in Site 1 101, the controller 125(1) may use a same IP address that the controller 125(2) assigns to a BD in Site 2 102. Similarly, a same set of IP addresses, software security indexes, and/or network segment indexes may be used by different controllers 125 when establishing their private namespaces. This conflict/overlap in the namespaces can present a problem when the host 115(1) and applications 120(1) in Site 1 101 attempt to send packets to the host 115(2) and applications 120(2) in Site 2 102 since the source identifiers (e.g., the IP address for the VRF instance, BD, or subnet, and the Class ID for the EPGs) in the packets can be assigned to multiple entities (e.g., a BD in Site 2 102 may have the same IP address as a BD in Site 1 101).

An MSO 130 is configured to manage communications across the different sites 101-104, e.g., by establishing and controlling site policies (e.g., for security, QoS, service chaining, and/or routing) and facilitating interoperability between the sites 101-104. In particular, as described in more detail below, the MSO 130 is configured to enable hosts 115 and/or applications 120 at each of the sites 101-104 to communicate with hosts 115 and/or applications 120 at other of the sites 101-104, regardless of the sites' respective configurations. For example, the MSO 130 can facilitate namespace translation mappings so that namespace information can be processed by each site 101-104, regardless of any conflicts/overlaps in the namespace information. Thus, each of the different sites 101-104 (including each of the hosts 115 and applications 120) can communicate using Layer 2 (L2) traffic without regard to any such conflicts/overlaps. The MSO 130 can be implemented via software, hardware, or a combination of software and hardware.

In an example embodiment, the MSO 130 is coupled to an application programming interface (API) 198 and a graphical user interface (GUI) 199, which can each be used by a system administrator to control operation of the MSO 130. For example, the system administrator may use the API 198 and/or GUI 199 to configure one or more policies for the system 100 without having to individually configure each site 101-104. Instead, the MSO 130 can receive the request from the system administrator and communicate with the local-site controllers 125 to implement the request across the system 100. Thus, to the perspective of the system administrator, the API 198 and GUI 199 can provide a "single pane of glass" that can be used to control the unified fabric of the system 100 as a whole.

Figure 2A:
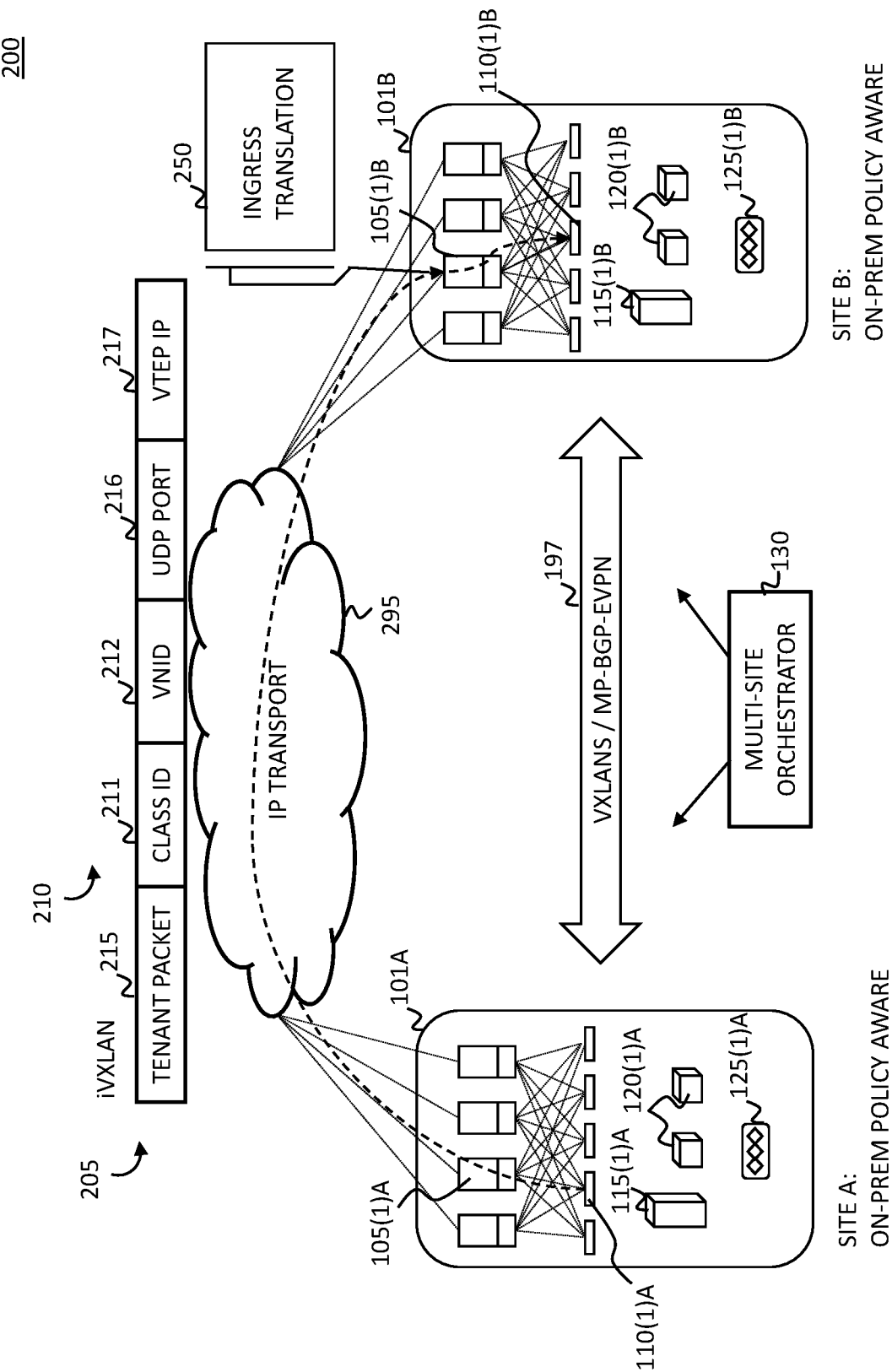
FIG. 2A is a block diagram illustrating an operation for transmitting a data packet from a first datacenter site to a second datacenter site, in connection with a system for simultaneous interoperability with policy-aware and policy-unaware data center sites, according to an example embodiment.
Figure 2B:
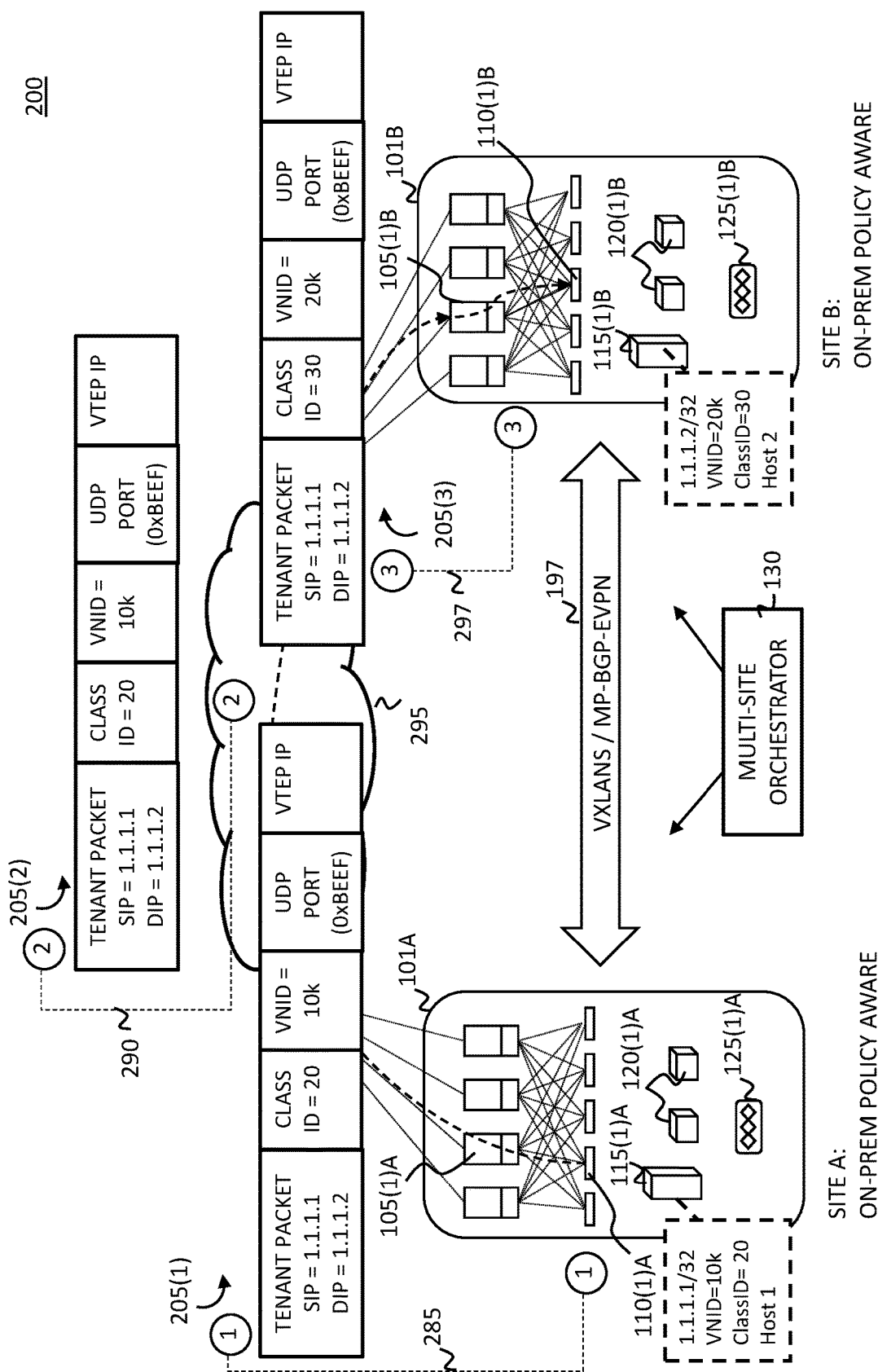
FIG. 2B is a block diagram illustrating data packets transmitted in the operations depicted in FIG. 2A, according to an example embodiment.

FIG. 2A is a block diagram illustrating an operation 200 for transmitting a data packet from a first datacenter site, Site A 101A, to a second datacenter site, Site B 101B, in connection with a system for simultaneous interoperability with policy-aware and policy-unaware data center sites, according to an example embodiment. FIG. 2B is a block diagram illustrating the data packet transmitted in the operations depicted in FIG. 2A, according to an example embodiment. FIGS. 2A and 2B are described together for ease of description.

Site A 101A and Site B 101B are each configured as on-premises policy aware sites, similar to Site 1 101 described above with reference to FIG. 1. In particular, each of Site A 101A and Site B 101B includes one or more spine switches 105(1) communicatively coupled to one or more leaf switches 110(1), which are in turn communicatively coupled to one or more hosts 115(1) and/or applications 120(1), with one or more controllers 125(1) managing the namespace for the respective site. Depending on policy configurations at the sites 101A and 101B, one or more of the hosts 115(1) and applications 120(1) at each of the sites 101A and 101B may communicate with one or more other of the hosts 115(1) and applications 120(1) at its own site or the other site. For example, if an EPG includes both an application 120(1)A at the first site 101A and an application 120(1)B at the second site (or if policies otherwise permit), the application 120(1)A and application 120(1)B may transfer packets to/from one another via one or more leaf switches 110(1)A at the first site, one or more spine switches 105(1)A at the first site, one or more spine switches 105(1)B at the second site, and one or more leaf switches 110(1)B at the second site 101B. An example packet 205 transmitted by the application 120(1)A, for example, may be transmitted from the application 120(1)A to a leaf switch 110(1)A, from the leaf switch 110(1)A to a spine switch 105(1)A, from the spine switch 105(1)A to a spine switch 105(1)(B), from the spine switch 105(1)(B) to a leaf switch 110(1)B, and from the leaf switch 110(1)B to the application 120(1)B. For example, the packet may be transmitted from the spine switch 105(1)A to the spine switch 105(1)B through an IP Transport 295 (e.g., the Internet) using one or more VXLANs with an MP-BGP-EVPN 197 or another network function.

In the example embodiment depicted in FIGS. 2A and 2B, the packet 205 includes a data packet (or "tenant packet") 215, which is carried as a payload in an encapsulated wrapper that includes an iVXLAN header 210. For example, the tenant data packet 215 can include a transmission control protocol (TCP) packet, user datagram protocol (UDP) packet, or another Ethernet or other type of packet. The iVXLAN header 210 includes reserved fields typically referred to as an "iVXLAN header," though the fields themselves do not necessarily constitute a packet "header," and other "headers" may be included along with the iVXLAN header 210. For example, the packet 205 can also include a UDP port header 216 identifying a layer 4 (L4) source port and/or L4 destination port, and a virtual tunnel end point (VTEP) internet protocol (IP) field 217 identifying a layer 3 (L3) IP destination address and/or IP source address. For example, the UDP port header 216 can include a default port ID value for the iVXLAN protocol, such as "0xBEEF".

The iVXLAN header 210 includes a class identifier (class ID) field 211 and a virtual network identifier (VNID) field 212. The VNID field 212 includes a VNID, which can identify any virtual network. For example, the VNID field 212 can specify an L3 forwarding context—a VRF—when the packet 205 is routed and an L2 forwarding context—a BD—when the packet 205 is bridged. The VNID field 212 also may be used to identify a subnet, an EPG, or another virtual network as appropriate. A size of the VNID field 212 may generally correlate to a number of virtual networks, which may be supported by the iVXLAN header 210. For example, a 24-bit VNID field 212 may support identification for up to 16 million different virtual networks.

The class ID field 211 is configured to identify a policy class for the packet 205. For example, the class ID field 211 can include a source policy class (or "SClass") for the packet source (for packets traversing in the forward direction) or a destination policy class (or "DClass") for the packet source (for packets traversing in the reverse direction). Access policy (e.g., a determination whether the packet 205 should be dropped or not, re-routed, re-encapsulated using an alternative encapsulation) may be dictated by the class ID field 211. For example, the spine device 105(1)B may compare the information in the class ID field 211 (in conjunction with the information in the VNID field 212 and locally stored policy and other information) to determine whether and how to ingest the packet 205. Because the class ID field 211 includes policy information, and sites 101A and 101B are configured to communicate using the iVXLAN protocol, which includes the class ID field 211, the sites 101A and 101B are considered "policy aware." As described in more detail below, sites configured to communicate in protocols without a class ID field 211 (or similar field for policy information)—e.g., the (standard) VXLAN protocol—may be considered "policy unaware."

The MSO 130 is configured to obtain configuration information for each of the sites 101A and 101B and cooperate with the sites 101A and 101B to enable different hosts 115(1) and/or applications 120(1) across the sites 101A and 101B to communicate with one another. For example, as shown at 250, for the transmission of the packet 205 from site A 101A to site B 101B, the MSO can install a DCI translator in the spine switch 105(1)B (and/or the leaf switch 110(1)B) so that, on ingress at site B 101B, an identifier in the class ID field 211 and an identifier in the VNID field 212 of the iVXLAN header 210 are translated from the namespace of site A 101A to the namespace of site B 101B. This "ingress translation" (or "upstream translation") can, e.g., cause the packet 205 to appear to have originated from an object (e.g., a host 115(1)B or application 120(1)B) in the (receiving) site B 101B. Thus, one or more applicable security contracts for site B 101B may be satisfied, and potential conflicts between namespaces can be avoided.

For example, site A 101A may name its VRF instance "VNID A", while site B 101B may name its VRF instance "VNID X". In order to stretch these objects so that they are treated as the same VRF instance across the sites 101A and 101B, the MSO 130 may provide a namespace translation mapping for site B 101B that indicates that a received packet that has a VRF VNID A should be translated to VRF VNIX X. In this manner, the different (and potentially conflicting) namespace values used by site A 101A and 101B may be reconciled. Similar mappings may be completed with respect to other instances (BDs, EPGs, etc.) stretched across the sites 101A and 101B. In addition, similar mappings may be completed with respect to hosts 115(1) and applications 120(1) belonging to different instances/EPGs across the different sites 101A and 101B. For example, following the example described above regarding packet 205, if the application 120(1)A belongs to a first EPG (e.g., "Web-EPG ABC") and the application 120(1)B belongs to a second EPG (e.g., "App-EPG XYZ"), the spine switch 105(1)B can translate the source identifiers in the packet 205 (i.e., the VNID and Class ID) to the namespace of site B 101B and then, using the translated source identifiers, determine whether there is a security contract at site B 101B that permits communications between Web-EPG ABC and App-EPG XYZ.

An example ingress translation operation involving the packet 250 is depicted in FIG. 2B. In the operation, the packet 250 is transmitted from a "Host 1" 115(1)A in Site A 101A to a "Host 2" 115(1)B in Site B 101B. Host 1 has an IP address equal to 1.1.1.1/32, a VNID equal to 10k, and a ClassID equal to 20, while Host 2 has an IP address equal to 1.1.1.2/32, a VNID equal to 20k, and a ClassID equal to 30. In a first stage 285, prior to transmission of the packet 205 from II Site A 101A, the packet 205 (identified in the first stage 285 as "205(1)" for clarity) includes a tenant packet field identifying a source IP address as 1.1.1.1 and a destination IP address as 1.1.1.2; a classID field identifying the classID as 20; a VNID field identifying the VNID as 10k, a UDP Port field including a port ID value of 0xBEEF (the default port ID value for the iVXLAN protocol); and a VTEP IP field. In a second stage 290, during transmission through the IP Transport 295, the packet 205 (identified in the second stage 290 as "205(2)" for clarity) includes tenant packet, classID, VNID, UDP Port, and VTEP IP fields substantially identical to the tenant packet, classID, VNID, UDP Port, and VTEP IP fields, respectively, of the packet 205(1) in the first stage 285. In other words, these fields of the packet 205 are not substantially modified between the first stage 285 and the second stage 290.

In a third stage 297, upon reception of the packet 205 at Site B 101B, the packet 205 (identified in the third stage 297 as "205(3)" for clarity) includes a tenant packet field identifying a source IP address as 1.1.1.1 and a destination IP address as 1.1.1.2; a classID field identifying the classID as 30; a VNID field identifying the VNID as 20k, a UDP Port field including a port ID value of 0xBEEF (the default port ID value for the iVXLAN protocol); and a VTEP IP field. Notably, values in the class ID field and VNID field have changed from the second stage 290; a DCI translator in the spine switch 105(1)B and/or the leaf switch 110(1)B has completed an ingress translation operation to change the class ID field and VNID field to match the class ID field and VNID field, respectively, of Host 2. Thus, on ingress at site B 101B, the identifier in the class ID field and the identifier in the VNID field are translated from the namespace of site A 101A to the namespace of site B 101B.

It should be appreciated that iVXLAN encapsulation is one of various different types of packet encapsulations, which may be used in connection with data transmissions. While the present disclosure describes operations involving iVXLAN headers, this description is illustrative and should not be construed as limiting in any way. For example, the described concepts may apply to other forms of encapsulation in alternative example embodiments.

Figure 3A:
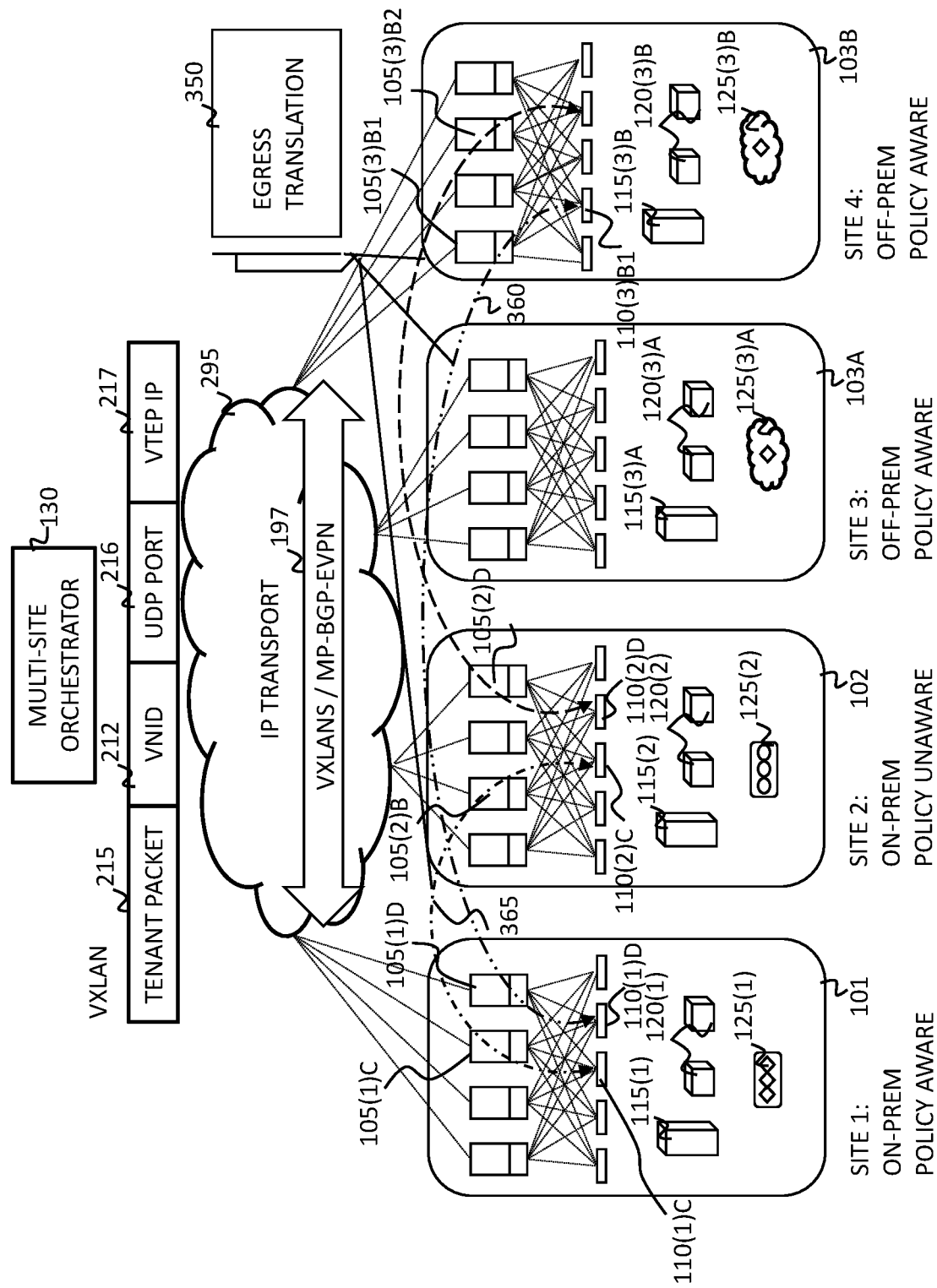
FIG. 3A is a block diagram illustrating operations for transmitting data packets between different datacenter sites, in connection with a system for simultaneous interoperability with policy-aware and policy-unaware data center sites, according to another example embodiment.
Figure 3B:
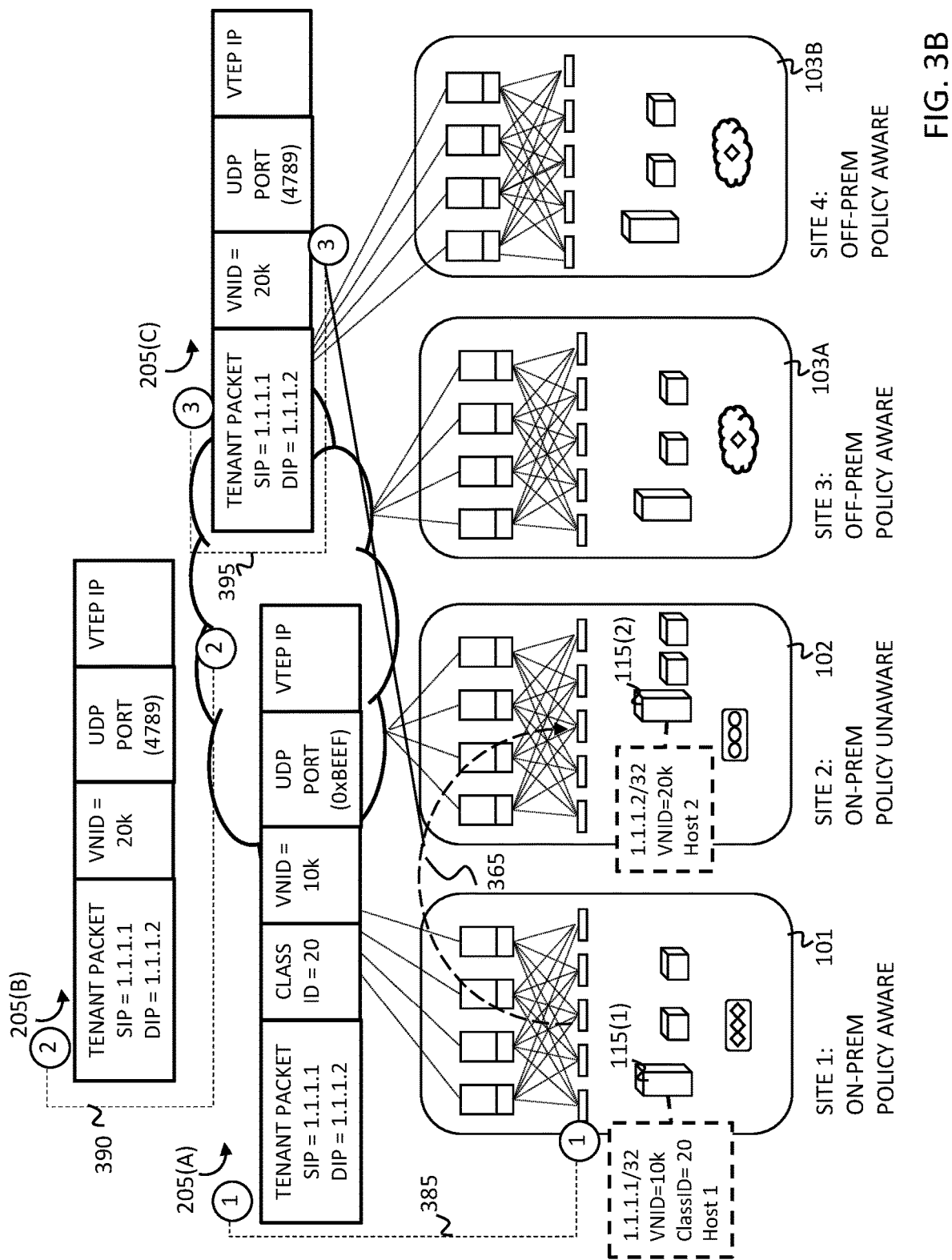
FIG. 3B is a block diagram illustrating data packets transmitted in the operations depicted in FIG. 3A, according to an example embodiment.

FIG. 3A is a block diagram illustrating operations 300 for transmitting data packets between different datacenter sites, namely Site 1 101, Site 2 102, Site 3 103A, and Site 4 103B, in connection with a system for simultaneous interoperability with policy-aware and policy-unaware data center sites, according to another example embodiment. Site 1 101 is configured as an on-premises policy aware site, similar to Site 1 101 described above with reference to FIG. 1; Site 2 102 is configured as an on-premises policy unaware site, similar to Site 2 102 described above with reference to FIG. 1; and each of Sites 3 103A and Site 4 103B is configured as an off-premises policy aware site, similar to Site 3 103 described above with reference to FIG. 1. FIG. 3B is a block diagram illustrating a data packet transmitted in the operations depicted in FIG. 3A, according to an example embodiment. FIGS. 3A and 3B are described together for ease of description.

Because Site 1 101, Site 3 103A, and Site 4 103B are policy aware, they are configured to communicate policy information using an iVXLAN header or other construct. However, Site 2 102 is policy unaware and, therefore, not configured to communicate policy information in that manner. Instead, Site 2 102 is configured to use a different form of packet encapsulation, such as (but not limited to) a (standard) VXLAN encapsulation. As shown in FIG. 3A, this encapsulation may involve, for example, similar fields to the iVXLAN encapsulation described above—including, e.g., headers/fields for tenant data packet 215, VNID 212, UDP port 216, and VTEP IP 217 information—though without a class ID field with policy information. For example, Site 1 101, Site 3 103A, and Site 4 103B can be configured to communicate with one another using the iVXLAN (or other policy-aware) encapsulation, and to communicate with Site 2 102 using the VXLAN (or another policy-unaware) encapsulation. For example, the UDP port header 216 for communications using VXLAN encapsulation can include a default port ID value for the VXLAN protocol, such as "4789". As may be appreciated, these encapsulations are illustrative and not limiting. For example, for simplicity, the sites may all communicate using a same (e.g., standard VXLAN or other) form of encapsulation, regardless of whether they are capable of supporting a different, potentially more complex form of encapsulation.

The MSO 130 is configured to obtain configuration information for each of the sites 101, 102, 103A, and 103B and cooperate with the sites to enable different hosts 115 and/or applications 120 across the sites 101, 102, 103A, and 103B to communicate with one another. For example, as shown at 350, for the transmission of packets between Site 1 101 and Site 2 102, transmission of packets between Site 1 101 and Site 4 103B, and transmission of packets between Site 2 102 and Site 4 103B, the MSO 130 can install a DCI translator in spine switches 105 and/or leaf switches 110 at the sites 101, 102, and 103B so that, on egress from one of the sites 101, 102, and 103B, an identifier in the VNID field 212 of the iVXLAN header 210 is translated from the namespace of the transmitting site to the namespace of the receiving site. The sites 101, 102, and 103B can enable this "egress translation" (or "downstream translation"), e.g., by providing to the MSO mapping information (e.g., VNID and/or next-hop information), which the MSO can use to enable the translation. Thus, namespace translation may be performed similar to the ingress translation described above, though prior to transmission instead of after transmission.

For example, as generally shown at 365, host 115(1) or application 120(1) at Site 1 101 may send data in a data packet to Site 2 102, from leaf switch 110(1)C to spine switch 105(1)C, from spine switch 105(1)C to spine switch 105(2)B (e.g., via the IP transport 295 and VXLANs 197), from spine switch 105(2)B to leaf switch 110(2)C (and from leaf switch 110(2)C to host 115(2) or an application 120(2), using a VXLAN encapsulation (or similar structure). The spine switch 105(1)C (or the leaf switch 110(1)C) may be configured to translate, at egress from the spine switch 105(1)C (or leaf switch 110(1)C, if applicable) the VNID in the VNID field 212 from the namespace of Site 1 101 to the namespace of Site 2 102 using the information provided by the MSO 130. As Site 1 is policy aware, it may be further configured to translate (at egress) any applicable class ID or other policy information from its namespace to a receiving site's namespace when communicating with a receiving site that is policy aware. For example, as generally shown at 360, host 115(1) or application 120(1) at Site 1 may send data in a data packet to Site 4 103B, from leaf switch 110(1)D to spine switch 105(1)D, from spine switch 105(1)D to spine switch 105(3)B1 (e.g., via the IP transport 295 and VXLANs 197), from spine switch 105(3)B1 to leaf switch 110(3)B1 (and from leaf switch 110(3)B1 to the host 115(3)B or application 120(3)B), using an iVXLAN encapsulation (or similar structure). The egress translation may involve, e.g., translating both the VNID in the VNID field 212 and a class ID or other field in the iVXLAN header of the packet.

An example egress translation operation involving a data packet being transmitted from Site 1 101 to Site 2 102 is depicted in FIG. 3B. In the operation, the data packet is transmitted from a "Host 1" 115(1) in Site 1 101 to a "Host 2" 115(2) in Site 2 102. Host 1 has an IP address equal to 1.1.1.1/32, a VNID equal to 10k, and a ClassID equal to 20, while Host 2 has an IP address equal to 1.1.1.2/32 and a VNID equal to 20k. Because Site 2 102 is policy-unaware, Host 2 does not have a ClassID. In a first stage 385, prior to transmission of the packet from Site 1 101, the packet (identified in the first stage 385 as "205(A)" for clarity) includes a tenant packet field identifying a source IP address as 1.1.1.1 and a destination IP address as 1.1.1.2; a classID field identifying the classID as 20; a VNID field identifying the VNID as 10k, a UDP Port field including a port ID value of 0xBEEF (the default port ID value for the iVXLAN protocol); and a VTEP IP field. In a second stage 390, during transmission through the IP Transport 295, the packet (identified in the second stage 390 as "205(B)" for clarity) includes a tenant packet field identifying a source IP address as 1.1.1.1 and a destination IP address as 1.1.1.2; a VNID field identifying the VNID as 20k, a UDP Port field including a port ID value of 4789 (the default port ID value for the standard VXLAN protocol); and a VTEP IP field. Notably, values in the VNID and UDP Port fields have changed from the first stage 385; a DCI translator in the spine switch 105(1)C and/or the leaf switch 110(1)C has completed an egress translation operation to change the VNID field to match the VNID field of Host 2, and also has changed the UDP Port field to reflect the standard VXLAN configuration of Site 2 102. Thus, on egress from Site 1 101, the identifier in the VNID field is translated from the namespace of Site 1 101 to the namespace of Site 2 102 in an encapsulation meeting a (standard VXLAN) configuration of Site 2 102. In a third stage 395, upon reception of the packet at Site 2 102, the packet (identified in the third stage 395 as "205(C)" for clarity), includes tenant packet, VNID, UDP Port, and VTEP IP fields substantially identical to the tenant packet, VNID, UDP Port, and VTEP IP fields, respectively, of the packet 205(B) in the second stage 390. In other words, these fields of the packet are not substantially modified between the second stage 390 and the third stage 395.

As may be appreciated, not all data center sites may be configured to support downstream translation. For example, a data center site may not be configured to support downstream translation if it is not configured to perform egress translation of VNID and/or ClassID information when transmitting a packet. In an example embodiment, the MSO 130 can be configured to determine configurations and capabilities of the various sites to determine whether and/or how downstream translation should be conducted. For example, the MSO 130 may be configured to perform (or cause to be performed) translations based on the DCI connectivity pair of to/from type sites.

In an example embodiment, the MSO 130 may determine whether a particular site supports downstream translation based on a type of framework at the site. For example, in making this determination, the MSO 130 may infer that an ACI framework is configured to support downstream translation, while one or more other frameworks may be inferred not to support downstream translation. The MSO 130 may, for example, assume, when it has limited or no information regarding a configuration of a particular framework, that the framework is not configured to support downstream translation (and potentially also is not configured to support upstream translation). As may be appreciated, these inferences are illustrative and other inferences and/or logic may be used. An example embodiment of example logic that may be used for these translations is described in greater detail below with reference to FIG. 6.

Figure 4A:
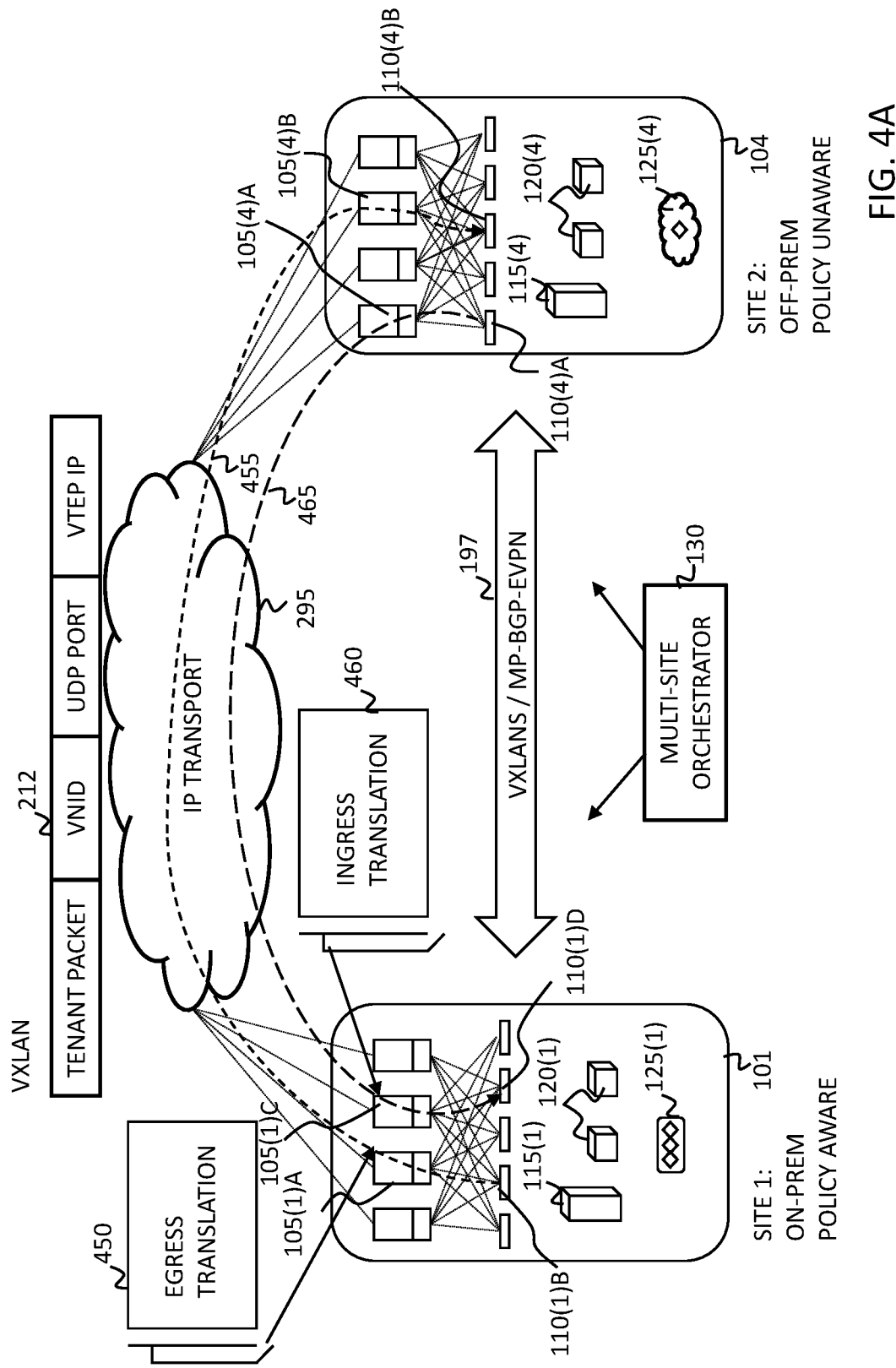
FIG. 4A is a block diagram illustrating an operation for transmitting a data packet from a first datacenter site to a second datacenter site, in connection with a system for simultaneous interoperability with policy-aware and policy-unaware data center sites, according to another example embodiment.
Figure 4B:
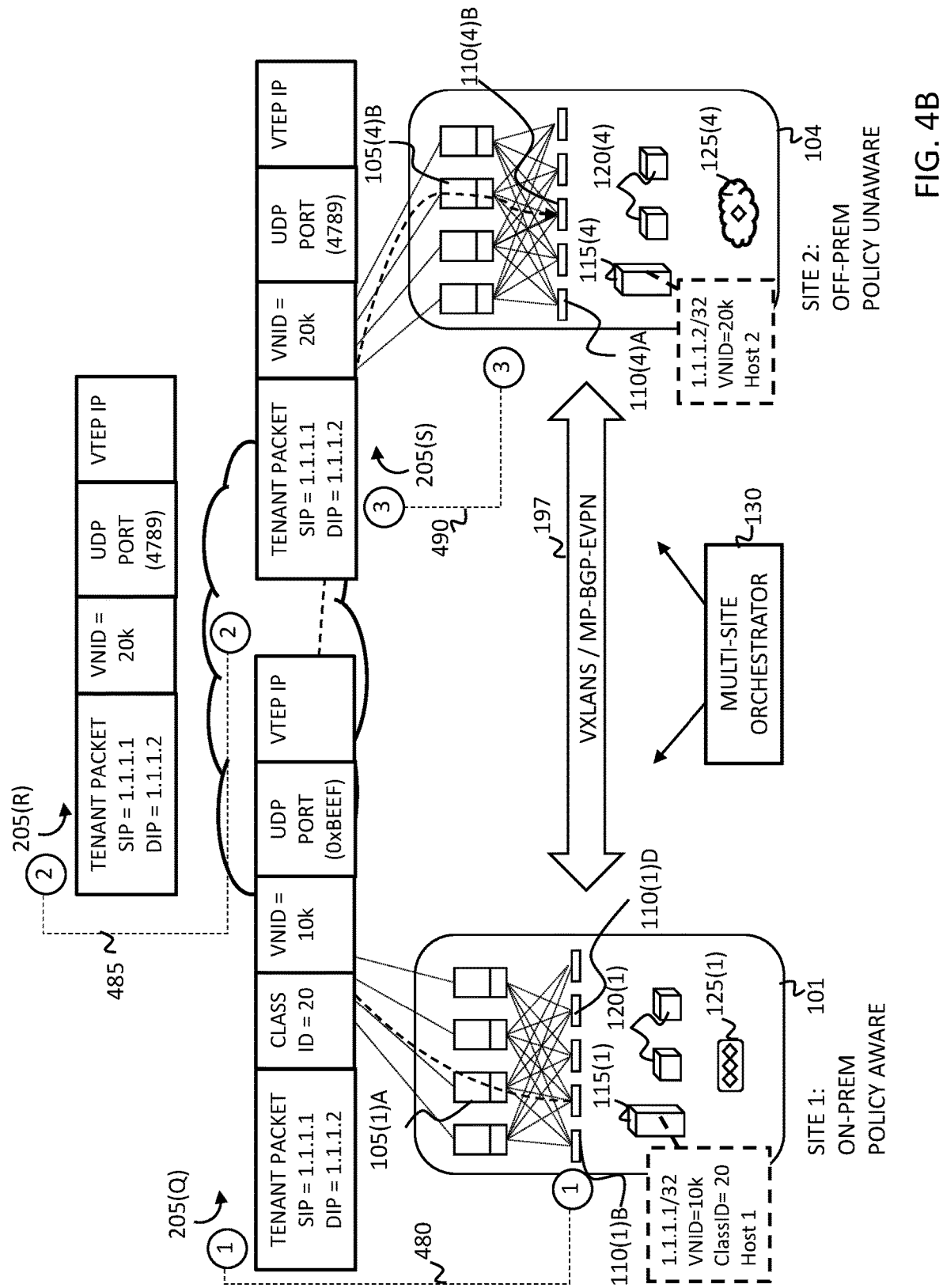
FIG. 4B is a block diagram illustrating data packets transmitted in a first of the operations depicted in FIG. 4A, according to an example embodiment.
Figure 4C:
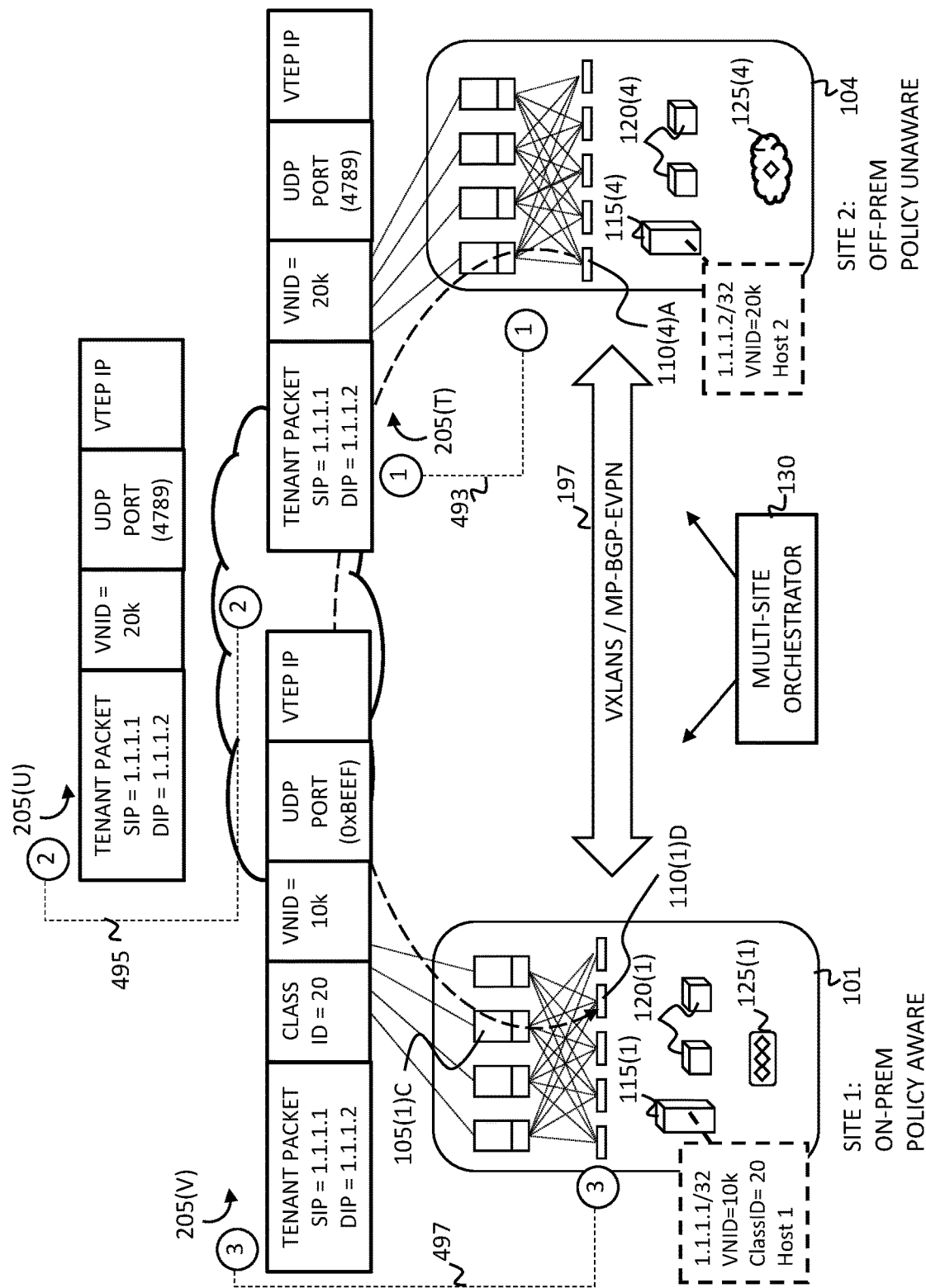
FIG. 4C is a block diagram illustrating data packets transmitted in a second of the operations depicted in FIG. 4A, according to an example embodiment.

FIG. 4A is a block diagram illustrating an operation 400 for transmitting data packets between a first datacenter site (Site 1) 101 configured to support downstream translation and a second datacenter site (Site 2) 104 not configured to support downstream translation, in connection with a system for simultaneous interoperability with policy-aware and policy-unaware data center sites, according to another example embodiment. FIG. 4B is a block diagram illustrating a data packet transmitted from Site 1 101 to Site 2 104, according to an example embodiment. FIG. 4C is a block diagram illustrating a data packet transmitted from Site 2 104 to Site 1 101, according to an example embodiment. FIGS. 4A, 4B, and 4C are described together for ease of description.

Site 1 101 is configured as an on-premises policy aware site, similar to Site 1 101 described above with reference to FIG. 1; Site 2 104 is configured as an off-premises policy unaware site, similar to Site 4 104 described above with reference to FIG. 1. Because Site 2 104 is policy unaware, it is configured to use a VXLAN or other form of encapsulation, which does not include a class ID field.

The MSO 130 is configured to obtain and assess configuration information for Site 1 101 and Site 2 104 to determine, among other things, whether each of these sites is configured to support downstream egress translation. In the example depicted in FIGS. 4A-4C, the MSO 130 has determined that Site 1 101 is configured to support downstream egress translation, while Site 2 104 is not configured to support downstream egress translation. Therefore, as generally shown at 450 and 460, the MSO 130 has instructed spine switches 105 at Site 1 101 to conduct egress translation for packets transmitted to Site 2 104 and to conduct ingress translation for packets received from Site 2 104. For example, host 115(1) or application 120(1) at Site 1 101 may send data in a data packet (along path 455) to Site 2 104, from leaf switch 110(1)B to spine switch 105(1)A, from spine switch 105(1)A to spine switch 105(4)B (e.g., via the IP transport 295 and VXLANs 197), from spine switch 105(4)B to leaf switch 110(4)B (and from leaf switch 110(4)B to a host 115(4) or application 120(4)), using a VXLAN encapsulation (or similar structure). The spine switch 105(1)A (or the leaf switch 110(1)B) may be configured to translate, at egress from the spine switch 105(1)A (or leaf switch 110(1)B, if applicable) the VNID in the VNID field 212 from the namespace of Site 1 101 to the namespace of Site 2 104 using information provided by the MSO 130.

Similarly, host 115(4) or application 120(4) may send data in a data packet (along path 465) to Site 1 101, from leaf switch 110(4)A to spine switch 105(4)A, from spine switch 105(4)A to spine switch 105(1)C (e.g., via the IP transport 295 and VXLANs 197), from spine switch 105(1)C to leaf switch 110(1)D (and from leaf switch 110(1)D to a host 115(1) or application 120(1)), using the VXLAN encapsulation (or similar structure). The spine switch 105(1)C (or the leaf switch 110(1)D) may be configured to translate, at ingress to the spine switch 105(1)C (or leaf switch 110(1)D, if applicable) the VNID in the VNID field 212 from the namespace of Site 2 104 to the namespace of Site 1 101 using information provided by the MSO 130. Thus, the MSO 130 can enable interoperability between Site 1 101 and Site 2 104 despite each of these sites using different namespaces and having different configurations and capabilities.

As may be appreciated, the translations performed at Site 1 101 are illustrative and additional or different translations may be included in alternative example embodiments. For example, Site 1 101 may translate additional fields, such as the class ID field described above, when Site 1 101 is communicating with another site using an iVXLAN or similar protocol.

An example egress translation operation involving a data packet being transmitted from Site 1 101 to Site 2 104 is depicted in FIG. 4B. In the operation, the data packet is transmitted from a "Host 1" 115(1) in Site 1 101 to a "Host 2" 115(4) in Site 2 104. Host 1 has an IP address equal to 1.1.1.1/32, a VNID equal to 10k, and a ClassID equal to 20, while Host 2 has an IP address equal to 1.1.1.2/32 and a VNID equal to 20k. Because Site 2 104 is policy-unaware, Host 2 does not have a ClassID. In a first stage 480, prior to transmission of the packet from Site 1 101, the packet (identified in the first stage 480 as "205(Q)" for clarity) includes a tenant packet field identifying a source IP address as 1.1.1.1 and a destination IP address as 1.1.1.2; a classID field identifying the classID as 20; a VNID field identifying the VNID as 10k, a UDP Port field including a port ID value of 0xBEEF (the default port ID value for the iVXLAN protocol); and a VTEP IP field. In a second stage 485, during transmission through the IP Transport 295, the packet (identified in the second stage 485 as "205(R)" for clarity) includes a tenant packet field identifying a source IP address as 1.1.1.1 and a destination IP address as 1.1.1.2; a VNID field identifying the VNID as 20k, a UDP Port field including a port ID value of 4789 (the default port ID value for the standard VXLAN protocol); and a VTEP IP field. Notably, values in the VNID and UDP Port fields have changed from the first stage 480; a DCI translator in the spine switch 105(1)A and/or the leaf switch 110(1)B has completed an egress translation operation to change the VNID field to match the VNID field of Host 2, and also has changed the UDP Port field to reflect the standard VXLAN configuration of Site 2 104. Thus, on egress from Site 1 101, the identifier in the VNID field is translated from the namespace of Site 1 101 to the namespace of Site 2 104, in an encapsulation meeting a (standard VXLAN) configuration of Site 2 104. In a third stage 490, upon reception of the packet at Site 2 104, the packet (identified in the third stage 490 as "205(S)" for clarity), includes tenant packet, VNID, UDP Port, and VTEP IP fields substantially identical to the tenant packet, VNID, UDP Port, and VTEP IP fields, respectively, of the packet 205(R) in the second stage 485. In other words, these fields of the packet are not substantially modified between the second stage 485 and the third stage 490.

An example ingress translation operation involving a data packet being transmitted from Site 2 104 to Site 1 101 is depicted in FIG. 4C. In the operation, the packet is transmitted from Host 2 115(4) in Site 2 104 to Host 1 115(1) in Site 1 101. In a first stage 493, prior to transmission of the packet from Site 2 104, the packet (identified in the first stage 493 as "205(T)" for clarity) includes a tenant packet field identifying a source IP address as 1.1.1.1 and a destination IP address as 1.1.1.2; a VNID field identifying the VNID as 20k, a UDP Port field including a port ID value of 4789 (the default port ID value for the standard VXLAN protocol); and a VTEP IP field. In a second stage 495, during transmission through the IP Transport 295, the packet (identified in the second stage 495 as "205(U)" for clarity) includes tenant packet, VNID, UDP Port, and VTEP IP fields substantially identical to the tenant packet, VNID, UDP Port, and VTEP IP fields, respectively, of the packet 205(T) in the first stage 493. In other words, these fields of the packet are not substantially modified between the first stage 493 and the second stage 495.

In a third stage 497, upon reception of the packet at Site 1 101, the packet (identified in the third stage 497 as "205(V)" for clarity) includes a tenant packet field identifying a source IP address as 1.1.1.1 and a destination IP address as 1.1.1.2; a classID field identifying the classID as 20; a VNID field identifying the VNID as 10k, a UDP Port field including a port ID value of 0xBEEF (the default port ID value for the iVXLAN protocol); and a VTEP IP field. Notably, the value in the VNID field has changed, and the ClassID field has been populated, from the second stage 495; a DCI translator in the spine switch 105(1)C and/or the leaf switch 110(1)D has completed an ingress translation operation to populate the class ID field and to change the VNID field to match the class ID field and VNID field, respectively, of Host 1 at Site 1 101. Thus, on ingress at Site 1 101, the identifier in the class ID field and the identifier in the VNID field are populated/translated to the namespace of Site 1 101.

Figure 5A:
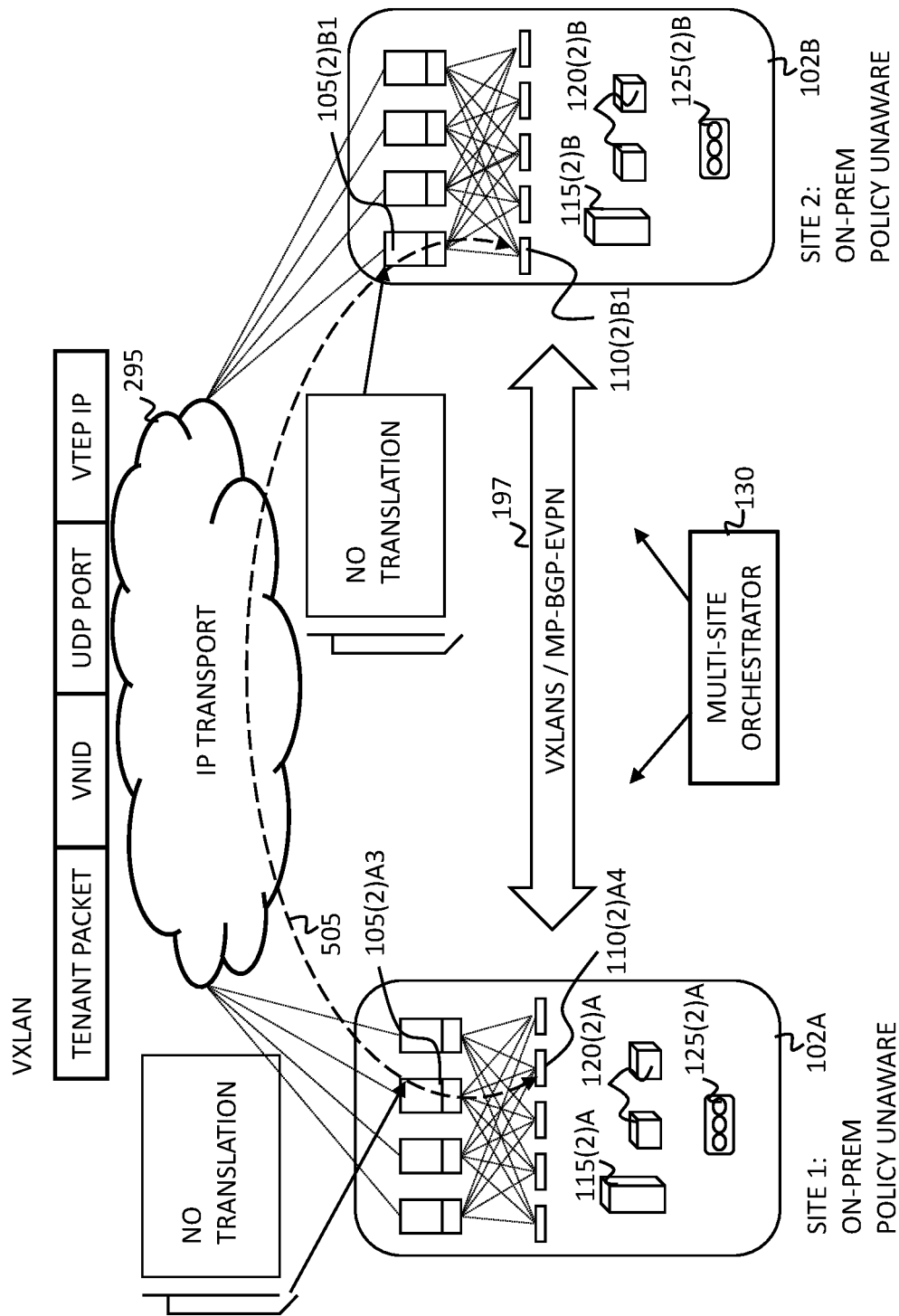
FIG. 5A is a block diagram illustrating an operation for transmitting a data packet from a first datacenter site to a second datacenter site, in connection with a system for simultaneous interoperability with policy-aware and policy-unaware data center sites, according to yet another example embodiment.
Figure 5B:
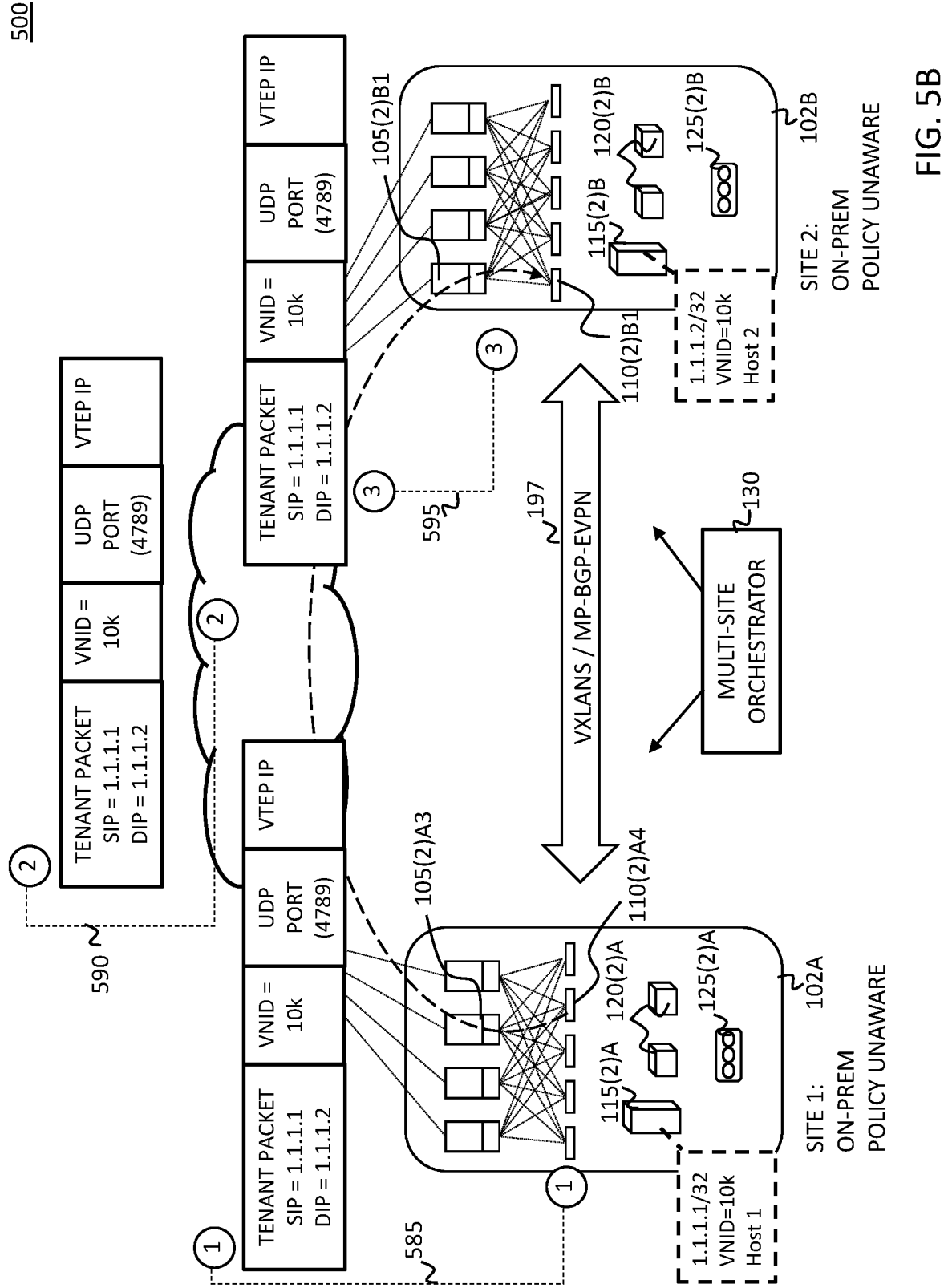
FIG. 5B is a block diagram illustrating data packets transmitted in the operations depicted in FIG. 5A, according to an example embodiment.

FIG. 5A is a block diagram illustrating an operation 500 for transmitting data packets between a first datacenter site (Site 1) 102A and a second datacenter site (Site 2) 102B, in connection with a system for simultaneous interoperability with policy-aware and policy-unaware data center sites, according to yet another example embodiment. FIG. 5B is a block diagram illustrating a data packet transmitted from Site 1 102A to Site 2 102B, according to an example embodiment. FIGS. 5A and 5B are described together for ease of description.

Site 1 102A and Site 2 102B are each configured as on-premises policy unaware sites, similar to Site 2 102 described above with reference to FIG. 1. In particular, each of Site 1 102A and Site 2 102B includes one or more spine switches 105(2) communicatively coupled to one or more leaf switches 110(2), which are in turn communicatively coupled to one or more hosts 115(2) and/or applications 120(2), with one or more controllers 125(2) managing the namespace for the respective site.

In the example depicted in FIGS. 5A and 5B, the MSO 130 has determined that neither Site 1 102A nor Site 2 102B is configured to support downstream egress translation. However, because both of the sites are located on-premises, the MSO 130 has assigned a global VNID across the sites 102A and 102B. Thus, VNID translation is not required. For example, as shown generally at 505, data packets may be transmitted from a host 115(2)A or application 120(2)A, to a leaf switch 110(2)A4 to a spine switch 105(2)A3, from the spine switch 105(2)A3 to a spine switch 105(2)B1 (e.g., via the IP transport 295 and VXLANs 197), from spine switch 105(2)B1 to leaf switch 110(2)B1 (and from leaf switch 110(2)B1 to a host 115(2)B or application 120(2)B), using the global VNID in a VXLAN encapsulation (or similar structure). For example, as seen in more detail in FIG. 5B, a data packet can be transmitted from Site 1 102A (in a first stage 585), through the IP transport 295 (in a second stage 590), and to Site 2 102B (in a third stage 595), with a global VNID (10k) assigned across the sites 102A and 102B. Thus, no translation is required, and the tenant packet, VNID, UDP Port, and VTEP IP fields are substantially identical at the first stage 585, second stage 590, and third stage 595. As may be appreciated, the MSO 130 may elect to adopt an alternative approach for brownfield scenarios with existing VRFs and/or networks, in case of overlapping VNIDs, to avoid potential disruption.

It should be appreciated that the example operations described above in connection with FIGS. 1, 2A, 2B, 3A, 3B, 4A, 4B, 4C, 5A, and 5B are illustrative and additional, less, or different operations may be included in alternative example embodiments. For example, FIG. 6 is a table 600 depicting various different example operations, which may be used to facilitate simultaneous interoperability with policy-aware and policy-unaware data center sites, according to an example embodiment. In particular:

When communicating from an on-premises policy aware site to an on-premises policy aware site (e.g., from/to a site similar to site 101 described above with reference to FIG. 1), an iVXLAN or other policy aware encapsulation protocol may be used along with ingress translations for both VNID and Class ID fields;

When communicating from an on-premises policy aware site to an off-premises policy aware site (e.g., from a site similar to site 101 described above with reference to FIG. 1 to a site similar to site 103 described above with reference to FIG. 1), an iVXLAN or other policy aware encapsulation protocol may be used along with downstream VNID assignment and egress VNID translation. For example, if Site 1 is an on-premises policy aware site (such as, but not limited to, a site using the ACI framework), and Site 2 is an off-premises policy aware site (such as, but not limited to, a site using a cloud-based framework that may or may not include the ACI framework), each of Site 1 and Site 2 can provide the other site (e.g., through an MSO and/or a spine or leaf switch) its local VNID for downstream VNID translations.

When communicating from an on-premises policy aware site to a policy unaware site (which may be either on premise or off premise, e.g., from a site similar to site 101 described above with reference to FIG. 1 to a site similar to site 102 or site 104 described above with reference to FIG. 1), a standard VXLAN or other policy unaware encapsulation protocol may be used along with egress translation if egress translation is supported downstream. If egress translation is not supported downstream, then the on-premises policy aware site can be configured to use ingress translation and egress translation as described above with reference to FIGS. 4A-4C.

When communicating from an off-premises policy aware site to an on-premises policy aware site (e.g., from a site similar to site 103 described above with respect to FIG. 1 to a site similar to site 101 described above with reference to FIG. 1), an iVXLAN or other policy aware encapsulation protocol may be used along with downstream VNID assignment and egress VNID translation.

When communicating from an off-premises policy aware site to an off-premises policy aware site (e.g., from/to a site similar to site 103 described above with respect to FIG. 1), an iVXLAN or other policy aware encapsulation protocol may be used along with downstream VNID assignment and egress VNID translation.

When communicating from an off-premises policy aware site to a policy unaware site (which may be either on premise or off premise, e.g., from a site similar to site 103 described above with reference to FIG. 1 to a site similar to site 102 or site 104 described above with reference to FIG. 1), a standard VXLAN or other policy unaware encapsulation protocol may be used along with downstream VNID assignment and egress VNID translation.

When communicating from a policy unaware site (which may be either on premise or off premise) to an on-premises policy aware site (e.g., from a site similar to site 102 or 104 described above with reference to FIG. 1 to a site similar to site 101 described above with reference to FIG. 1), a standard VXLAN or other policy unaware encapsulation protocol may be used along with egress translation if egress translation is supported downstream. If egress translation is not supported downstream, then the on-premises policy aware site can be configured to use ingress translation and egress translation as described above with reference to FIGS. 4A-4C.

When communicating from a policy unaware site (which may be either on premise or off premise) to an off-premises policy aware site (e.g., from a site similar to site 102 or 104 described above with reference to FIG. 1 to a site similar to site 103 described above with reference to FIG. 1), a standard VXLAN or other policy unaware encapsulation protocol may be used along with downstream VNID assignment and egress VNID translation.

When communicating from a policy unaware site (which may be either on premise or off premise) to a policy unaware site (e.g., from/to a site similar to site 102 or 104 described above with reference to FIG. 1), a standard VXLAN or other policy unaware encapsulation protocol may be used along with downstream VNID assignment and egress VNID translation. Alternatively, a global VNID may be used without VNID translations.

FIG. 7 is a flow chart depicting a method 700 for facilitating simultaneous interoperability with policy-aware and policy-unaware data center sites, according to an example embodiment. In step 705, an MSO device obtains configuration information for each of a plurality of datacenter sites. The configuration includes, for one or more network devices at each of the datacenter sites, whether the network device is on-premises vs. off-premises, policy aware, and/or configured to support downstream VNID translation.

In step 710, for a communication involving at least a first datacenter site and a second datacenter site, the MSO determines whether downstream VNID translation is supported by the first datacenter site. For example, the first datacenter site can include a policy unaware network device, and the second datacenter site can include an on-premises policy aware network device. The determination in step 710 can include, for example, determining whether the first datacenter site is configured to support downstream VNID translations by determining whether the first datacenter site is configured (or known to be configured) to perform egress VNID translations. For example, it may be determined that downstream VNID translation is not supported if it is known that the first datacenter site is not configured to perform egress VNID translations, e.g., because a framework of the first datacenter site is not configured for egress VNID translations. In addition, or in the alternative, it may be determined that downstream VNID translation is not supported if it is unknown whether the first datacenter site is configured to perform egress VNID translations. For example, when limited or no information regarding a configuration of a framework of the first datacenter site is known, it may be (conservatively) assumed/inferred that the first datacenter site is not configured to perform egress VNID translations.

If the MSO determines in step 710 that downstream VNID translation is not supported, then the method 700 continues to step 715. In step 715, the MSO causes both egress VNID translation and ingress VNID translation to be performed by the second datacenter site. For example, the MSO can instruct, and/or provision software (e.g., for a DCI translator) to, the second datacenter site to perform ingress translation and egress translation as described above with reference to FIGS. 4A-4C.

If the MSO determines in step 710 that downstream VNID translation is supported, then the method 700 continues to step 720. In step 720, the MSO causes egress VNID translation, but not ingress VNID translation, to be performed by the second datacenter site. For example, the MSO can instruct, and/or provision software (e.g., for a DCI translator) to, the second datacenter site to perform the egress translation as described above with reference to FIG. 4B.

As would be recognized by a person of skill in the art, the steps associated with the methods of the present disclosure, including method 700, may vary widely. Steps may be added, removed, altered, combined, and reordered without departing from the spirit or the scope of the present disclosure. Therefore, the example methods are to be considered illustrative and not restrictive, and the examples are not to be limited to the details given herein but may be modified within the scope of the appended claims.

Figure 8:
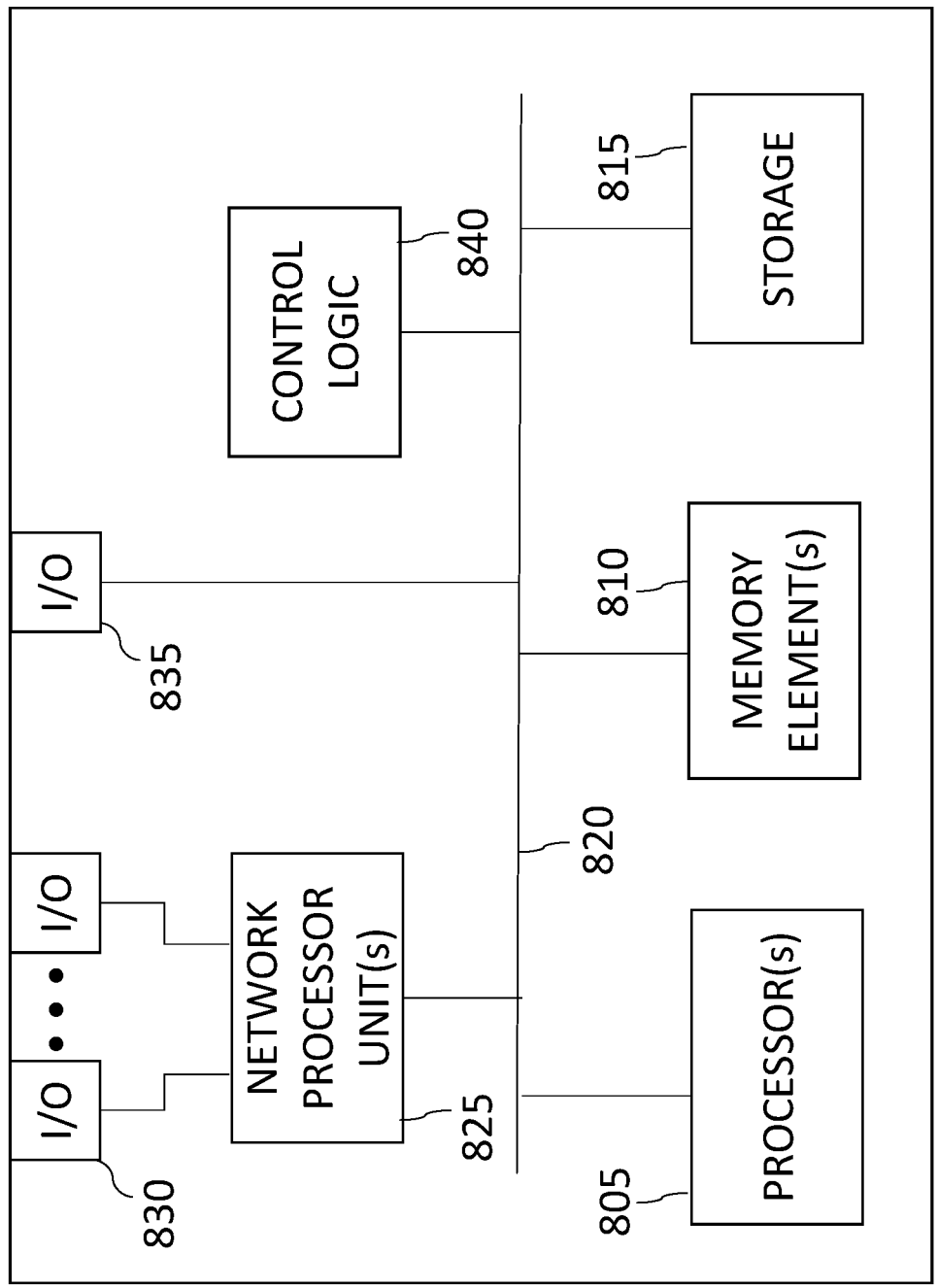
FIG. 8 is a hardware block diagram of a computing device that may perform functions associated with any combination of operations, in connection with the techniques depicted in FIGS. 1-7.

Referring to FIG. 8, FIG. 8 illustrates a hardware block diagram of a computing device 800 that may perform functions associated with operations discussed herein in connection with the techniques depicted in FIGS. 1-7. In various example embodiments, a computing device, such as computing device 800 or any combination of computing devices 800, may be configured as any entity/entities as discussed for the techniques depicted in connection with FIGS. 1-7, such as the controllers 125, spine switches 105, leaf switches 110, hosts 115, applications 120, MSO 130, etc., in order to perform operations of the various techniques discussed herein.

It should be appreciated that FIG. 8 provides only an illustration of one embodiment and does not imply any limitations with regard to the environments in which different embodiments may be implemented. Many modifications to the depicted environment may be made.

In at least one embodiment, computing device 800 may include one or more processor(s) 805, one or more memory element(s) 810, storage 815, a bus 820, one or more network processor unit(s) 825 interconnected with one or more network input/output (I/O) interface(s) 830, one or more I/O interface(s) 835, and control logic 840. In various embodiments, instructions associated with logic for computing device 800 can overlap in any manner and are not limited to the specific allocation of instructions and/or operations described herein.

In at least one embodiment, processor(s) 805 is/are at least one hardware processor configured to execute various tasks, operations and/or functions for computing device 800 as described herein according to software and/or instructions configured for computing device. Processor(s) 805 (e.g., a hardware processor) can execute any type of instructions associated with data to achieve the operations detailed herein. In one example, processor(s) 805 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 810 and/or storage 815 is/are configured to store data, information, software, and/or instructions associated with computing device 800, and/or logic configured for memory element(s) 810 and/or storage 815. For example, any logic described herein (e.g., control logic 840) can, in various embodiments, be stored for computing device 800 using any combination of memory element(s) 810 and/or storage 815. Note that in some embodiments, storage 815 can be consolidated with memory element(s) 810 (or vice versa), or can overlap/exist in any other suitable manner.

In at least one embodiment, bus 820 can be configured as an interface that enables one or more elements of computing device 800 to communicate in order to exchange information and/or data. Bus 820 can be implemented with any architecture designed for passing control, data and/or information between processors, memory elements/storage, peripheral devices, and/or any other hardware and/or software components that may be configured for computing device 800. In at least one embodiment, bus 820 may be implemented as a fast kernel-hosted interconnect, potentially using shared memory between processes (e.g., logic), which can enable efficient communication paths between the processes.

In various embodiments, network processor unit(s) 825 may enable communication between computing device 800 and other systems, entities, etc., via network I/O interface(s) 830 to facilitate operations discussed for various embodiments described herein. In various embodiments, network processor unit(s) 825 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 830 can be configured as one or more Ethernet port(s), Fibre Channel ports, and/or any other I/O port(s) now known or hereafter developed. Thus, the network processor unit(s) 825 and/or network I/O interfaces 830 may include suitable interfaces for receiving, transmitting, and/or otherwise communicating data and/or information in a network environment.

I/O interface(s) 835 allow for input and output of data and/or information with other entities that may be connected to computer device 800. For example, I/O interface(s) 835 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 840 can include instructions that, when executed, cause processor(s) 805 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., control logic 840) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 810 and/or storage 815 can store data, software, code, instructions (e.g., processor instructions), logic, parameters, combinations thereof, and/or the like used for operations described herein. This includes memory element(s) 810 and/or storage 815 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, in one form, a computer-implemented method includes determining whether at least a first datacenter site of a plurality of datacenter sites is configured to support downstream virtual network identifier (VNID) translation. For at least a first communication involving the first datacenter site and a second datacenter site of the plurality of datacenter sites, both egress VNID translation and ingress VNID translation can be caused to be performed by the second datacenter site in response to determining that downstream VNID translation is not supported by the first datacenter site. Egress VNID translation, but not ingress VNID translation, can be caused to be performed by the second datacenter site in response to determining that downstream VNID translation is supported by the first datacenter site. For example, causing both egress VNID translation and ingress VNID translation to be performed by the second datacenter site can include installing a data center interconnect translator in a network device of the second datacenter site.

In an example embodiment, causing both the egress VNID translation and the ingress VNID translation to be performed by the second datacenter site can be performed further in response to determining that the first datacenter site is a policy unaware data center site and the second datacenter site is a policy aware datacenter site. In addition, or in the alternative, causing both the egress VNID translation and ingress VNID translation to be performed by the second datacenter site can be performed further in response to determining that the second datacenter site is an on-premises policy aware datacenter site.

For at least a second communication involving the second datacenter site and a third datacenter site of the plurality of datacenter sites, an ingress VNID translation and Class Identifier (ClassID) translation can be caused to be performed by one of the second datacenter site or the third datacenter site receiving the at least second communication when each of the second datacenter site and the third datacenter site is an on-premises policy aware datacenter site. For example, for at least a third communication involving the second datacenter site and the third datacenter site, an egress VNID translation can be caused to be performed by one of the second datacenter site or the third datacenter site sending the at least third communication when the third datacenter site is an off-premises policy aware datacenter site. In addition, or in the alternative, for at least another communication involving another datacenter site of the plurality of datacenter sites and yet another datacenter site of the plurality of datacenter sites, an egress VNID translation can be caused to be performed by one of the another or yet another datacenter sites sending the at least another communication when the other of the another or yet another datacenter sites is an off-premises policy aware datacenter site.

In an another example embodiment, for at least a second communication involving a third datacenter site and a fourth datacenter site, an egress VNID translation can be caused to be performed by one of the third datacenter site or the fourth datacenter site sending the at least second communication when another of the third datacenter site or the fourth datacenter site supports downstream VNID translation. For example, for the at least second communication, a global VNID can be caused to be used without VNID translation when both the third datacenter site and the fourth datacenter site are policy unaware datacenter sites and the other of the third datacenter site or the fourth datacenter site does not support downstream VNID translation.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein.

Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
obtaining, by a multi-site orchestrator, configuration information for each of a plurality of datacenter sites;
determining, based on the configuration information, whether at least a first datacenter site of the plurality of datacenter sites is configured to support downstream virtual network identifier (VNID) translation; and
for at least a first communication involving the first datacenter site and a second datacenter site of the plurality of datacenter sites:
causing both egress VNID translation and ingress VNID translation to be performed by the second datacenter site in response to determining that downstream VNID translation is not supported by the first datacenter site; and
causing egress VNID translation, but not ingress VNID translation, to be performed by the second datacenter site in response to determining that downstream VNID translation is supported by the first datacenter site.

2. The computer-implemented method of claim 1, wherein causing both the egress VNID translation and the ingress VNID translation to be performed by the second datacenter site is performed further in response to determining that the first datacenter site is a policy unaware data center site and the second datacenter site is a policy aware datacenter site.

3. The computer-implemented method of claim 2, wherein causing both the egress VNID translation and ingress VNID translation to be performed by the second datacenter site is performed further in response to determining that the second datacenter site is an on-premises policy aware datacenter site.

4. The computer-implemented method of claim 1, further comprising, for at least a second communication involving the second datacenter site and a third datacenter site of the plurality of datacenter sites, causing an ingress VNID translation and Class Identifier (ClassID) translation to be performed by one of the second datacenter site or the third datacenter site receiving the at least second communication when each of the second datacenter site and the third datacenter site is an on-premises policy aware datacenter site.

5. The computer-implemented method of claim 4, further comprising, for at least a third communication involving the second datacenter site and the third datacenter site, causing an egress VNID translation to be performed by one of the second datacenter site or the third datacenter site sending the at least third communication when the third datacenter site is an off-premises policy aware datacenter site.

6. The computer-implemented method of claim 1, further comprising, for at least a second communication involving a third datacenter site of the plurality of datacenter sites and a fourth datacenter site of the plurality of datacenter sites, causing an egress VNID translation to be performed by one of the third datacenter site or the fourth datacenter site sending the at least second communication when another of the third datacenter site or the fourth datacenter site is an off-premises policy aware datacenter site.

7. The computer-implemented method of claim 1, further comprising, for at least a second communication involving a third datacenter site of the plurality of datacenter sites and a fourth datacenter site of the plurality of datacenter sites, causing an egress VNID translation to be performed by one of the third datacenter site or the fourth datacenter site sending the at least second communication when another of the third datacenter site or the fourth datacenter site supports downstream VNID translation.

8. The computer-implemented method of claim 7, further comprising for the at least second communication, causing a global VNID to be used without VNID translation when both the third datacenter site and the fourth datacenter site are policy unaware datacenter sites and the other of the third datacenter site or the fourth datacenter site does not support downstream VNID translation.

9. The computer-implemented method of claim 1, wherein causing both egress VNID translation and ingress VNID translation to be performed by the second datacenter site comprises installing a data center interconnect translator in a network device of the second datacenter site.

10. An apparatus comprising:
one or more memories configured to store data; and
one or more processors coupled to the memory and configured to perform operations including:
  obtaining configuration information for each of a plurality of datacenter sites;
  determining, based on the configuration information, whether at least a first datacenter site of the plurality of datacenter sites is configured to support downstream virtual network identifier (VNID) translation; and
  for at least a first communication involving the first datacenter site and a second datacenter site of the plurality of datacenter sites:
    causing both egress VNID translation and ingress VNID translation to be performed by the second datacenter site in response to determining that downstream VNID translation is not supported by the first datacenter site; and
    causing egress VNID translation, but not ingress VNID translation, to be performed by the second datacenter site in response to determining that downstream VNID translation is supported by the first datacenter site.

11. The apparatus of claim 10, wherein the one or more processors are further configured to cause both the egress VNID translation and the ingress VNID translation to be performed by the second datacenter site further in response to determining that the first datacenter site is a policy unaware data center site and the second datacenter site is a policy aware datacenter site.

12. The apparatus of claim 11, wherein the one or more processors are further configured to cause both the egress VNID translation and the ingress VNID translation to be performed by the second datacenter site further in response to determining that the second datacenter site is an on-premises policy aware datacenter site.

13. The apparatus of claim 10, wherein the one or more processors are further configured to, for at least a second communication involving the second datacenter site and a third datacenter site of the plurality of datacenter sites, cause an ingress VNID translation and Class Identifier (ClassID) translation to be performed by one of the second datacenter site or the third datacenter site receiving the at least second communication when each of the second datacenter site and the third datacenter site is an on-premises policy aware datacenter site.

14. The apparatus of claim 13, wherein the one or more processors are further configured to, for at least a third communication involving the second datacenter site and the third datacenter site, cause an egress VNID translation to be performed by one of the second datacenter site or the third datacenter site sending the at least third communication when the third datacenter site is an off-premises policy aware datacenter site.

15. The apparatus of claim 10, wherein the one or more processors are further configured to cause both egress VNID translation and ingress VNID translation to be performed by the second datacenter site by installing a data center interconnect translator in a network device of the second datacenter site.

16. One or more non-transitory computer readable storage media comprising instructions that, when executed by at least one processor, are operable to:
obtain configuration information for each of a plurality of datacenter sites;
determine, based on the configuration information, whether at least a first datacenter site of the plurality of datacenter sites is configured to support downstream virtual network identifier (VNID) translation; and
for at least a first communication involving the first datacenter site and a second datacenter site of the plurality of datacenter sites:
  cause both egress VNID translation and ingress VNID translation to be performed by the second datacenter site in response to determining that downstream VNID translation is not supported by the first datacenter site; and cause egress VNID translation, but not ingress VNID translation, to be performed by the second datacenter site in response to determining that downstream VNID translation is supported by the first datacenter site.

17. The one or more non-transitory computer readable storage media of claim 16, wherein the instructions, when executed by at least one processor, are further operable to cause both the egress VNID translation and the ingress VNID translation to be performed by the second datacenter site further in response to determining that the first datacenter site is a policy unaware data center site and the second datacenter site is a policy aware datacenter site.

18. The one or more non-transitory computer readable storage media of claim 17, wherein the instructions, when executed by at least one processor, are further operable to cause both the egress VNID translation and the ingress VNID translation to be performed by the second datacenter site further in response to determining that the second datacenter site is an on-premises policy aware datacenter site.

19. The one or more non-transitory computer readable storage media of claim 16, wherein the instructions, when executed by at least one processor, are further operable to, for at least a second communication involving the second datacenter site and a third datacenter site of the plurality of datacenter sites, cause an ingress VNID translation and Class Identifier (ClassID) translation to be performed by one of the second datacenter site or the third datacenter site receiving the at least second communication when each of the second datacenter site and the third datacenter site is an on-premises policy aware datacenter site.

20. The one or more non-transitory computer readable storage media of claim 16, wherein the instructions, when executed by at least one processor, are further operable to cause both egress VNID translation and ingress VNID translation to be performed by the second datacenter site by installing a data center interconnect translator in a network device of the second datacenter site.

* * * * *